United States Patent
Murota

(10) Patent No.: US 8,029,706 B2
(45) Date of Patent: Oct. 4, 2011

(54) VACUUM TRANSFER APPARATUS AND METHOD

(75) Inventor: Tsukasa Murota, Shizuoka (JP)

(73) Assignee: Sony Disc & Digital Solutions, Inc., Tokyo (JP)

( * ) Notice: Subject to any disclaimer, the term of this patent is extended or adjusted under 35 U.S.C. 154(b) by 620 days.

(21) Appl. No.: 12/134,764

(22) Filed: Jun. 6, 2008

(65) Prior Publication Data

US 2009/0025630 A1    Jan. 29, 2009

(30) Foreign Application Priority Data

Jul. 25, 2007 (JP) ................... 2007-193190

(51) Int. Cl.
*B29D 11/00* (2006.01)
*B29C 43/56* (2006.01)

(52) U.S. Cl. ...... 264/1.33; 264/1.38; 264/101; 264/293; 425/174.4; 425/385; 425/403.1; 425/810

(58) Field of Classification Search .............. 264/1.1, 264/1.33, 1.36, 1.38, 101, 293; 425/174.4, 425/403.1, 810, 385, 388
See application file for complete search history.

(56) References Cited

U.S. PATENT DOCUMENTS

2003/0051815 A1 * 3/2003 Kosuda et al. ........... 156/345.31
2007/0291630 A1   12/2007 Nishimura et al.

FOREIGN PATENT DOCUMENTS

| JP | 3-173955 | * | 7/1991 |
|---|---|---|---|
| JP | 2000-064042 | | 2/2000 |
| JP | 2000-298887 | | 10/2000 |
| JP | 2004-303385 | | 10/2004 |
| JP | 2005-310247 | | 11/2005 |
| JP | 2006-127654 | | 5/2006 |
| JP | 2006-351103 | | 12/2006 |

OTHER PUBLICATIONS

Japanese Office Action issued Jun. 28, 2011, for corresponding Japanese Patent Appln. No. 2007-193190.

* cited by examiner

*Primary Examiner* — Mathieu D. Vargot
(74) *Attorney, Agent, or Firm* — K&L Gates LLP

(57) ABSTRACT

A vacuum transfer apparatus including an auxiliary vacuum chamber and a main vacuum chamber is used for transferring an uneven pattern to a disk substrate with a stamper. The auxiliary vacuum chamber is vacuumized or opened to air because the disk substrate is conveyed to and from the vacuum transfer apparatus through the auxiliary vacuum chamber. The disk substrate conveyed to the auxiliary vacuum chamber and then to the main vacuum chamber after the auxiliary vacuum chamber is vacuumized. In the main vacuum chamber, transferring of the uneven pattern with the stamper, curing of UV-curable resin, and removal of the stamper are performed to provide a disk substrate with the uneven pattern. Then, the disk substrate is conveyed from the vacuum transfer apparatus through the auxiliary vacuum chamber. An operation at the auxiliary-vacuum-chamber side and an operation at the main-vacuum-chamber side are performed in parallel.

4 Claims, 19 Drawing Sheets

VACUUM TRANSFER APPARATUS AND METHOD

CROSS REFERENCES TO RELATED APPLICATIONS

The present application claims priority to Japanese Patent Application JP 2007-193190 filed in the Japanese Patent Office on Jul. 25, 2007, the entire contents of which is incorporated herein by reference.

BACKGROUND

The present disclosure relates to a vacuum transfer apparatus that transfers an uneven pattern on a disk substrate with a stamper in a vacuum space, and a vacuum transfer method.

In a manufacturing procedure of optical disks, an uneven pattern such as a pit pattern or a groove pattern formed on a stamper is transferred by pressing the stamper to a photoreactive resin layer spread on a disk substrate, and curing the photoreactive resin layer.

Japanese Unexamined Patent Application Publication Nos. 2004-303385, 2005-310247, and 2006-351103 disclose a technique of transferring a pit pattern on a disk substrate with a stamper, and a technique of transferring a pit pattern in a vacuum space.

To transfer an uneven pattern, such as a pit and a land, or a groove, on a disk substrate with a stamper, the following process is typically performed. First, uncured UV-curable resin is spread on a disk substrate by spin coating.

Then, a stamper having an uneven pattern is pressed to a layer of the UV-curable resin. In this state, UV irradiation is performed, thereby curing the layer of the UV-curable resin. After the UV-curable resin is cured, the stamper is removed from the disk substrate.

Herein, in the case of transferring the uneven pattern as described above, air bubbles may be generated in the resin layer or dusts may enter the resin layer when the stamper is pressed to the layer of the uncured UV-curable resin. This may adversely affect the shape of a fine uneven pattern, and finally affect the quality of a disk reproduction signal. That is, the quality of an optical disk to be manufactured may be degraded.

To prevent air bubbles and the like from being generated, the above-described transfer process is processed in a vacuum space with a vacuum transfer apparatus.

In a vacuum transfer apparatus of a related art, a disk substrate with a layer of uncured UV-curable resin applied is conveyed to a vacuum transfer unit in which a single stamper is provided, and the stamper is pressed to the disk substrate in vacuum so as to transfer an uneven pattern. Subsequently, the substrate together with the stamper is conveyed to an UV irradiation device, the layer of the UV-curable resin is cured with ultraviolet (UV), and after the UV-curable resin is cured, the disk substrate is removed from the stamper.

Unfortunately, in such a vacuum transfer process, a manufacturing time for a single disk (transfer process time) may be increased, thereby degrading the efficiency of the optical disk production.

At the time when the disk substrate is conveyed to the vacuum transfer apparatus, the internal space of the vacuum transfer apparatus is opened to air. After the disk substrate is conveyed thereinto, the internal space is sealed, vacuuming is started, and thus, a vacuum space is created. Vacuuming is performed, for example, with a vacuum pump. Even if a vacuum pump has a high exhaust performance, increasing the degree of vacuum to a high vacuum may rapidly degrade the exhaust performance, and hence, a time is necessary for obtaining a desired degree of vacuum.

That is, relatively time-consuming vacuuming has to be performed every time when a single disk substrate is processed; resulting in that a process time for a single disk substrate may be increased.

In addition, the internal space has to be opened to air every time when a disk substrate is conveyed to or from the vacuum transfer apparatus. This may cause dusts in a peripheral area to enter the vacuum transfer apparatus.

In order to decrease the manufacturing time for a single disk substrate in the process with the vacuum transfer apparatus, it is necessary to prepare a plurality of stampers and a plurality of vacuum transfer apparatuses, so that equivalent operations are performed in a plurality of parallel lines.

However, equipment for the parallel lines may become large, thereby seriously increasing the installation cost of the production line. Further, extremely strict quality control is necessary for a stamper so as to accurately transfer an uneven pattern. If equivalent stampers are used in a plurality of lines, the quality control of these stampers may be seriously troublesome work. Thus, the large-scale lines do not provide a desired efficiency.

Therefore, it is desired to decrease a time for a vacuum transfer process, with a reduced number of stampers (desirably, a single stamper). Accordingly, it is desirable to provide a vacuum transfer apparatus capable of decreasing a time for a vacuum transfer process, and a vacuum transfer method.

SUMMARY

A vacuum transfer apparatus according to an embodiment of the present invention includes an auxiliary vacuum chamber capable of being vacuumized with a vacuum suction mechanism and being opened to air with an open-to-air mechanism; a main vacuum chamber capable of being vacuumized with a vacuum suction mechanism; a substrate conveying unit that conveys a disk substrate to and from the auxiliary vacuum chamber; an inter-chamber conveying unit that conveys the disk substrate between the auxiliary vacuum chamber and the main vacuum chamber; and a transfer unit that performs a transfer process in which an uneven pattern is transferred on the disk substrate in the main vacuum chamber with a stamper. The main vacuum chamber is continuously in vacuum during an operation thereof. The auxiliary vacuum chamber is vacuumized when the substrate conveying unit has conveyed the disk substrate to the auxiliary vacuum chamber. After the vacuuming, the inter-chamber conveying unit conveys the disk substrate from the auxiliary vacuum chamber to the main vacuum chamber, and the transfer unit performs the transfer process. After the transfer process, the inter-chamber conveying unit conveys the disk substrate with the transfer process performed, from the main vacuum chamber to the auxiliary vacuum chamber, the auxiliary vacuum chamber is opened to air, and the substrate conveying unit conveys the disk substrate from the auxiliary vacuum chamber.

The substrate conveying unit may convey the disk substrate with uncured UV-curable resin applied. The vacuum transfer apparatus may further include a UV irradiation unit that performs UV irradiation to the disk substrate for the transfer process in the main vacuum chamber. During the transfer process with the transfer unit, the UV-curable resin with an uneven pattern may be cured by the UV irradiation with the UV irradiation unit, the stamper may be removed from the disk substrate after the UV-curable resin is cured, and the inter-chamber conveying unit may convey the disk substrate from the main vacuum chamber to the auxiliary vacuum chamber.

The auxiliary vacuum chamber may have a smaller spatial volume than that of the main vacuum chamber. The auxiliary vacuum chamber may be vacuumized to a lower degree of vacuum than that of the main vacuum chamber. Regarding expressions "high" and "low" for the degree of vacuum, "high" means a degree of vacuum closer to perfect vacuum.

The substrate conveying unit and the inter-chamber conveying unit may respectively define walls of the auxiliary vacuum chamber to seal the auxiliary vacuum chamber for vacuuming.

A vacuum transfer method according to an embodiment is for forming an uneven pattern on a disk substrate with a vacuum transfer apparatus having a main vacuum chamber and an auxiliary vacuum chamber. The method includes the steps of vacuumizing the main vacuum chamber; conveying the disk substrate to the auxiliary vacuum chamber, vacuumizing the auxiliary vacuum chamber, and then conveying the disk substrate from the auxiliary vacuum chamber to the main vacuum chamber; performing a transfer process in which the uneven pattern is transferred on the disk substrate with a stamper in the main vacuum chamber; conveying the disk substrate with the transfer process performed, from the main vacuum chamber to the auxiliary vacuum chamber; and opening the auxiliary vacuum chamber to air, and conveying the disk substrate from the auxiliary vacuum chamber.

That is, in the embodiments, the vacuum transfer apparatus including the auxiliary vacuum chamber and the main vacuum chamber is used to transfer the uneven pattern on the disk substrate with the stamper.

In this case, the disk substrate is conveyed to and from the vacuum transfer apparatus through the auxiliary vacuum chamber. In the auxiliary vacuum chamber, vacuuming and opening to air are performed. In contrast, the main vacuum chamber is not opened to air. Thus, vacuuming does not have to be performed every time when a single disk substrate is conveyed to the main vacuum chamber.

While the uneven pattern is transferred in vacuum with the stamper in the main vacuum chamber, the UV-curable resin is cured on the disk substrate and the stamper is removed from the disk substrate. Accordingly, a disk substrate with a pit or a groove as the uneven pattern can be manufactured by a single process.

With the vacuum transfer apparatus and the vacuum transfer method according to the embodiments, the time necessary for the transfer process with the stamper can be decreased because of the following reasons.

Since vacuuming and opening to air are performed in the auxiliary vacuum chamber, opening to air does not have to be performed in the main vacuum chamber. Since the auxiliary vacuum chamber is a space not for actual transfer, the degree of vacuum does not have to be high. The auxiliary vacuum chamber is a space merely for allowing a disk substrate to pass through during conveyance of the disk substrate. Hence, the auxiliary vacuum chamber may have a small spatial volume. Accordingly, vacuuming does not take a long time.

In addition, the process in the auxiliary vacuum chamber and the process in the main vacuum chamber can be performed in parallel.

Further, since the uneven pattern is cured and the stamper is removed in the vacuum transfer apparatus, the process of forming the cured uneven pattern on the disk substrate can be performed by a single process with the vacuum transfer apparatus.

With the above reasons, a process time for a single disk substrate can be decreased, thereby increasing manufacturing efficiency of optical disks.

The vacuum transfer apparatus and the vacuum transfer method according to the embodiments can increase the efficiency of the transfer process. Thus, it is not necessary to arrange multiple transfer process lines in parallel. Accordingly, the equipment investment can be prevented from being increased, and the troublesome work for the quality control of the multiple stampers can be prevented from being generated.

Additional features and advantages are described herein, and will be apparent from the following Detailed Description and the figures.

DETAILED DESCRIPTION

A vacuum transfer apparatus, and disk manufacturing using a vacuum transfer method are described below according to an embodiment.

Figure 1:
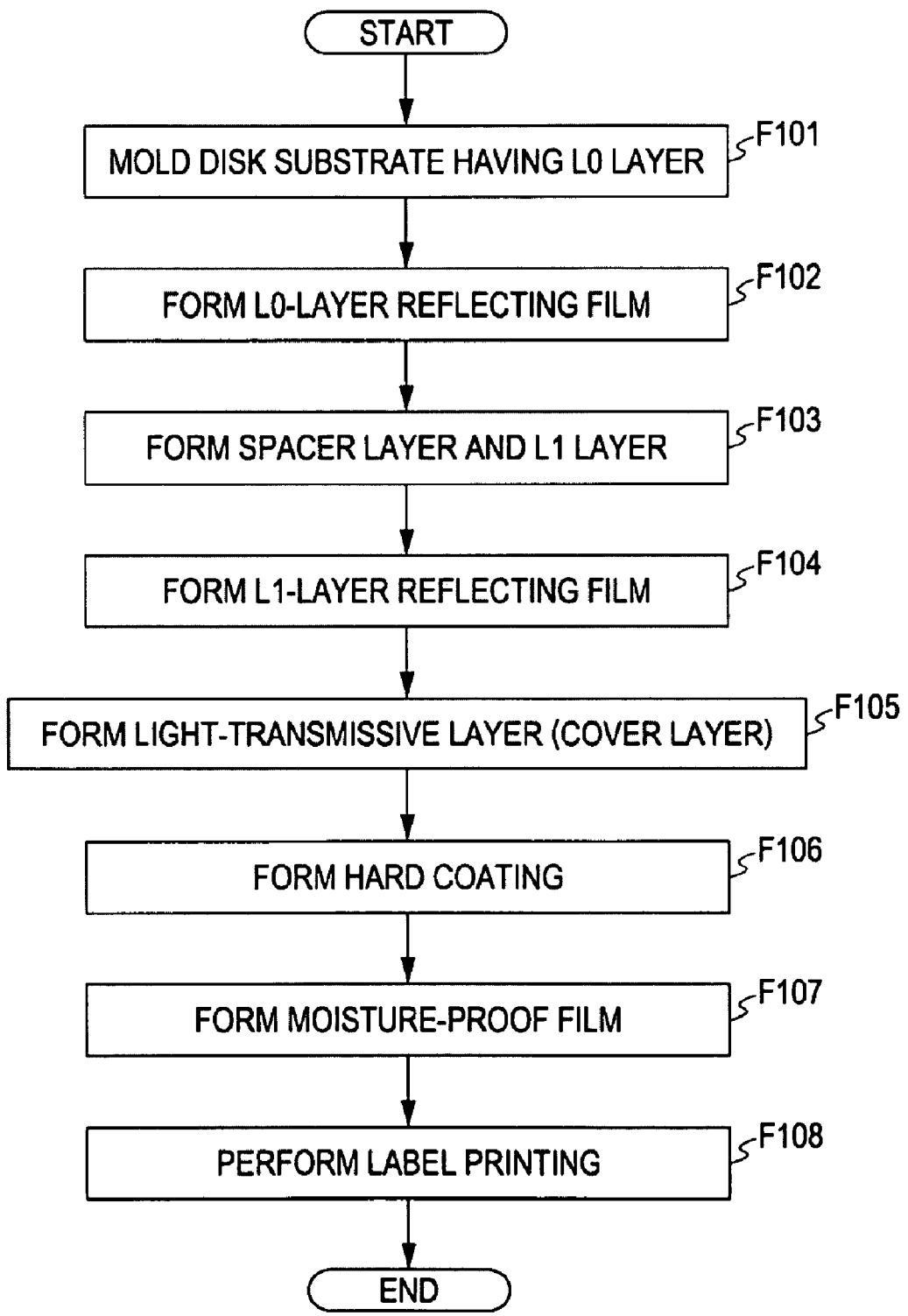
FIG. 1 is a flowchart showing a disk manufacturing procedure according to an embodiment.

FIG. 1 shows an overview procedure for disk manufacturing according to the embodiment. The overview procedure in FIG. 1 is described with reference to FIGS. 2A to 3E.

Note that described herein is manufacturing of a reproduction-only two-layer disk including two recording layers of a L0 layer and a L1 layer. For the manufacturing of the two-layer disk, a master having a pit pattern as data to be recorded in the L0 layer, and a master having a pit pattern as data to be recorded in the L1 layer are prepared. A stamper for forming the L0 layer (hereinafter, referred to as L0-layer stamper), and a stamper for forming the L1 layer (hereinafter, referred to as L1-layer stamper), are formed by respectively using the masters.

The disk manufacturing procedure in FIG. 1 is for manufacturing an optical disk by using the L0-layer stamper and the L1-layer stamper.

In a method of manufacturing an optical disk in this embodiment, first, a L0-layer substrate is molded in step F101. For example, a disk substrate 1 is molded by injection molding using, for example, polycarbonate resin. The disk substrate 1 molded herein is a substrate having a pit pattern, or a L0 layer.

Figure 2A:
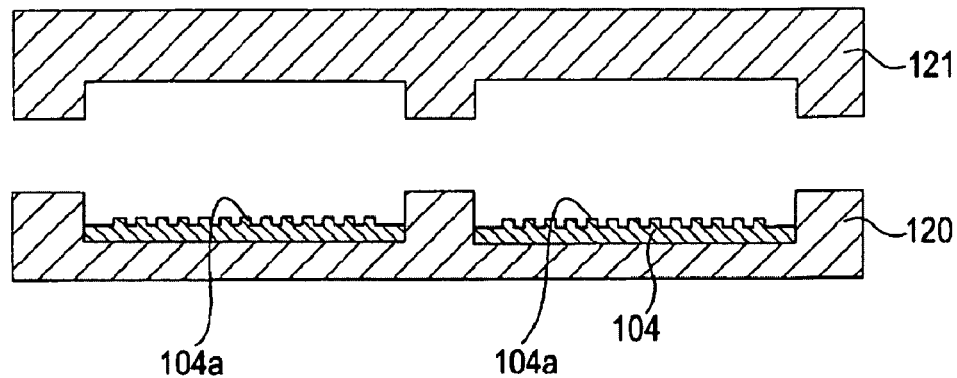
FIGS. 2A to 2D are explanatory views showing a substrate in the manufacturing procedure according to the embodiment, FIG. 2D being an enlarged view of a part IID in FIG. 2C.

FIG. 2A briefly illustrates a metal mold for molding the disk substrate 1 having the L0 layer. The metal mold includes a lower cavity 120 and an upper cavity 121. A L0-layer stamper 104 for transferring a data pit of the L0-layer is disposed in the lower cavity 120. An uneven pattern 104a serving as a data pit is formed in the L0-layer stamper 104.

The L0-layer stamper 104 having the uneven pattern 104a of the data pit is arranged as an emboss pit in the manufacturing procedure of the reproduction-only disk. Alternatively, in a manufacturing procedure of a recordable disk (for example, write-once disk or rewritable disk), a stamper having an uneven pattern for forming a groove (wobbling groove) serving as a recording track is arranged.

Figure 2B:
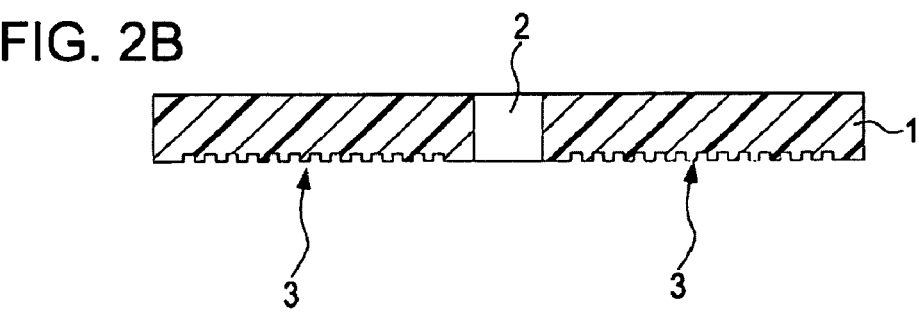

The disk substrate 1 having the L0 layer is molded by injection molding using such a metal mold, and the molded disk substrate 1 may be one as shown in FIG. 2B.

The disk substrate 1 made of polycarbonate resin has a center hole 2 at its center. A data read surface of the disk substrate 1 is a data pit pattern (L0 pit pattern 3) in which the uneven pattern 104a of the L0-layer stamper 104 in the metal mold is transferred.

In the case of manufacturing a write-once disk or a rewritable disk, a groove (continuous groove) is formed instead of a data pit.

Figure 2C:
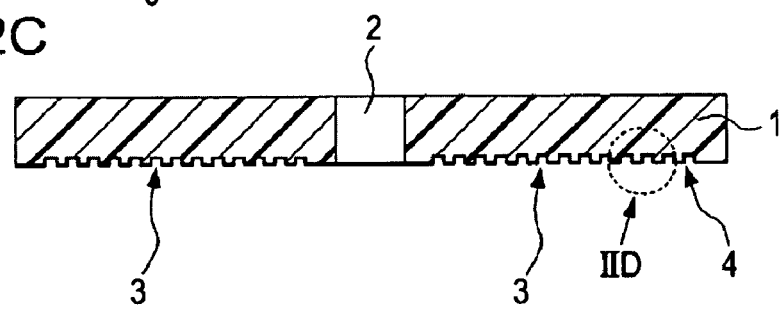
Figure 2D:
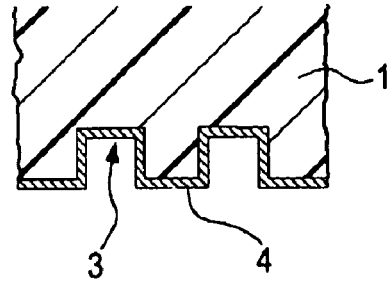

Then, in step F102, a reflecting film (L0-layer reflecting film 4) is formed on the disk substrate 1 by sputtering. In particular, as shown in FIGS. 2C and 2D, for example, a L0-layer reflecting film 4 made of a silver alloy is formed on a signal read surface having the L0 pit pattern 3.

Then, in step F103, a spacer layer and a L1 layer are formed.

Figure 3A:
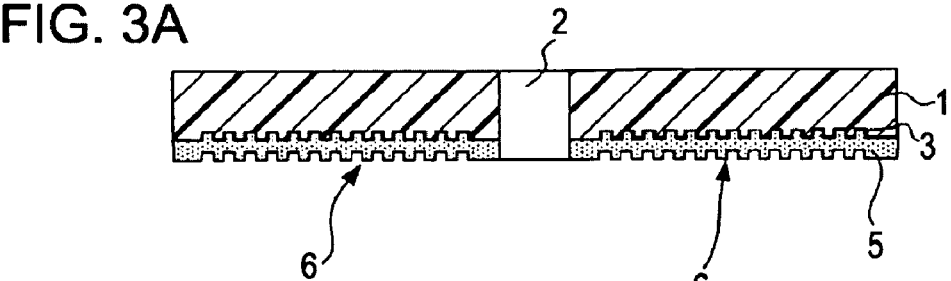
FIGS. 3A to 3E are explanatory views showing the substrate in the manufacturing procedure according to the embodiment, FIG. 3C being an enlarged view of a part IIIC in FIG. 3B.

The process of forming the spacer layer and the L1 layer is a process using the vacuum transfer apparatus according to the embodiment. Hence, the process will be described later in more detail with reference to FIG. 4 and other subsequent figures. Basically, UV-curable resin is spread by spin coating on a substrate surface having the L0-layer reflecting film 4 as shown in FIG. 2C, and the substrate is conveyed to the vacuum transfer apparatus. Then, the resin is cured while a L1-layer stamper is pressed to the resin in the vacuum transfer apparatus. Then, the L1-layer stamper is removed. Accordingly, a spacer layer 5 (also referred to as intermediate layer) and a data pit pattern of the L1 layer (L1 pit pattern 6) are formed on the L0-layer substrate 1 as shown in FIG. 3A.

Figure 3B:
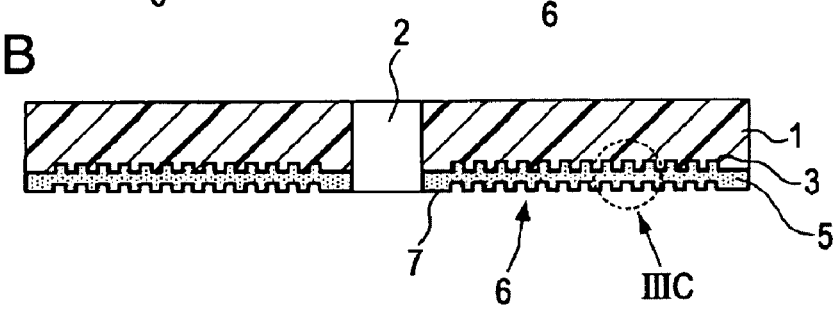
Figure 3C:
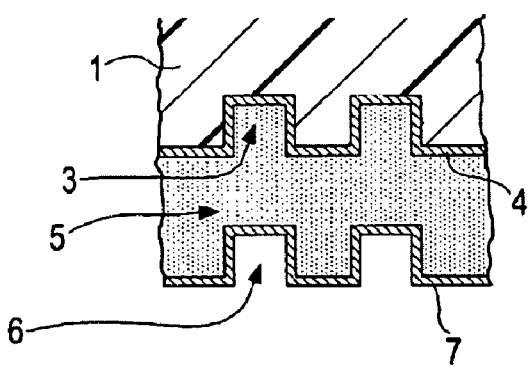

Next, in step F104, a L1-layer reflecting film 7 is formed. In particular, after the spacer layer 5 and the L1 pit pattern 6 are formed on the L0-layer substrate 1 as shown in FIGS. 3B and 3C, a transflective film (L1-layer reflecting film 7) is formed on the L1 pit pattern 6 by sputtering.

Figure 3D:
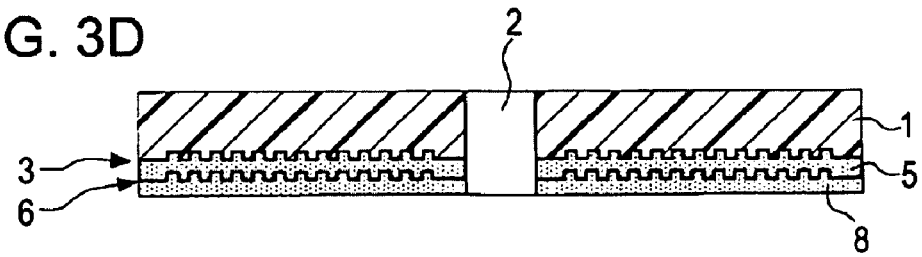

Then, in step F105, a light-transmissive layer (also referred to as cover layer) 8 is formed as shown in FIG. 3D. For example, the cover layer 8 is formed such that UV-curable resin for a cover layer is spread by spin coating, and is irradiated with UV to be cured. Alternatively, the cover layer 8 may be formed, for example, by bonding a polycarbonate sheet.

Figure 3E:
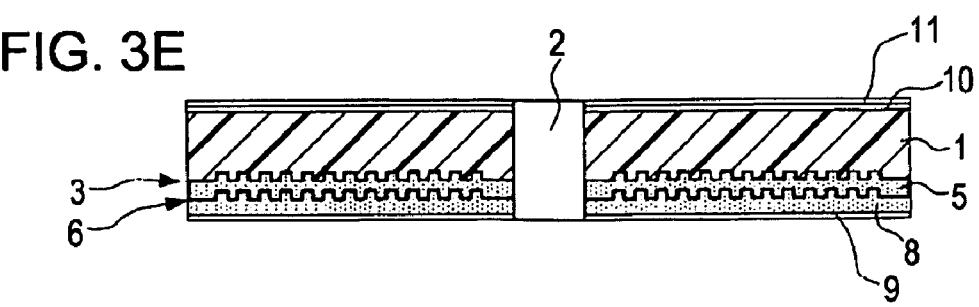

Then, steps F106, F107, and F108 are performed to be a state in FIG. 3E.

In particular, in step F106, a hard coating layer 9 is formed as surface processing provided on the signal read surface. For example, UV-curable resin for a hard coating layer is provided on the cover layer 8 by dropping, and is spread by spin coating. Then, the UV-curable resin is irradiated with UV to be cured, and thus, the hard coating layer 9 is formed. Alternatively, the hard coating layer 9 may not be formed.

Then, in step F107, a moisture-proof film 10 is formed on the label surface (surface opposite to the data read surface). Alternatively, the moisture-proof film 10 may not be formed.

Finally, in step F108, printing is performed on the label surface of the disk substrate (L0-layer substrate 1) having the above-described layer structure. For example, a print layer 11 is formed on the label surface by offset printing of, for example, color printing.

An inspection is performed, and thus an optical disk is completed.

This embodiment uses the vacuum transfer apparatus particularly in the process of forming the spacer layer and the L1 layer in step F103 from among the entire procedure from molding of the substrate to completion of the disk.

The process of forming the spacer layer and the L1 layer with the vacuum transfer apparatus is described in more detail with reference to FIGS. 4 to 19.

Figure 4:
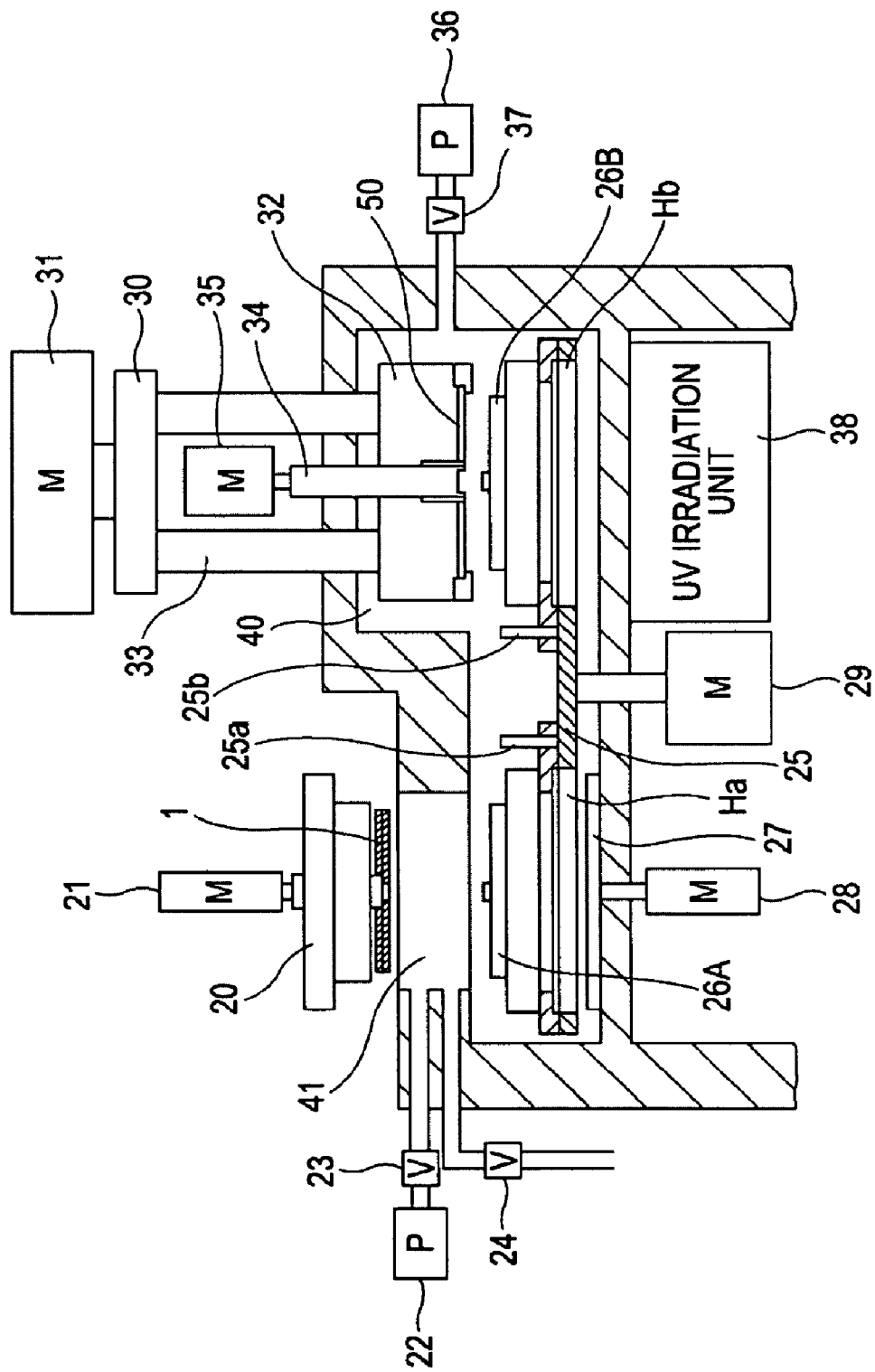
FIG. 4 is an explanatory view showing a vacuum transfer apparatus according to the embodiment.

FIG. 4 illustrates a structure of the vacuum transfer apparatus according to the embodiment.

Figure 5:
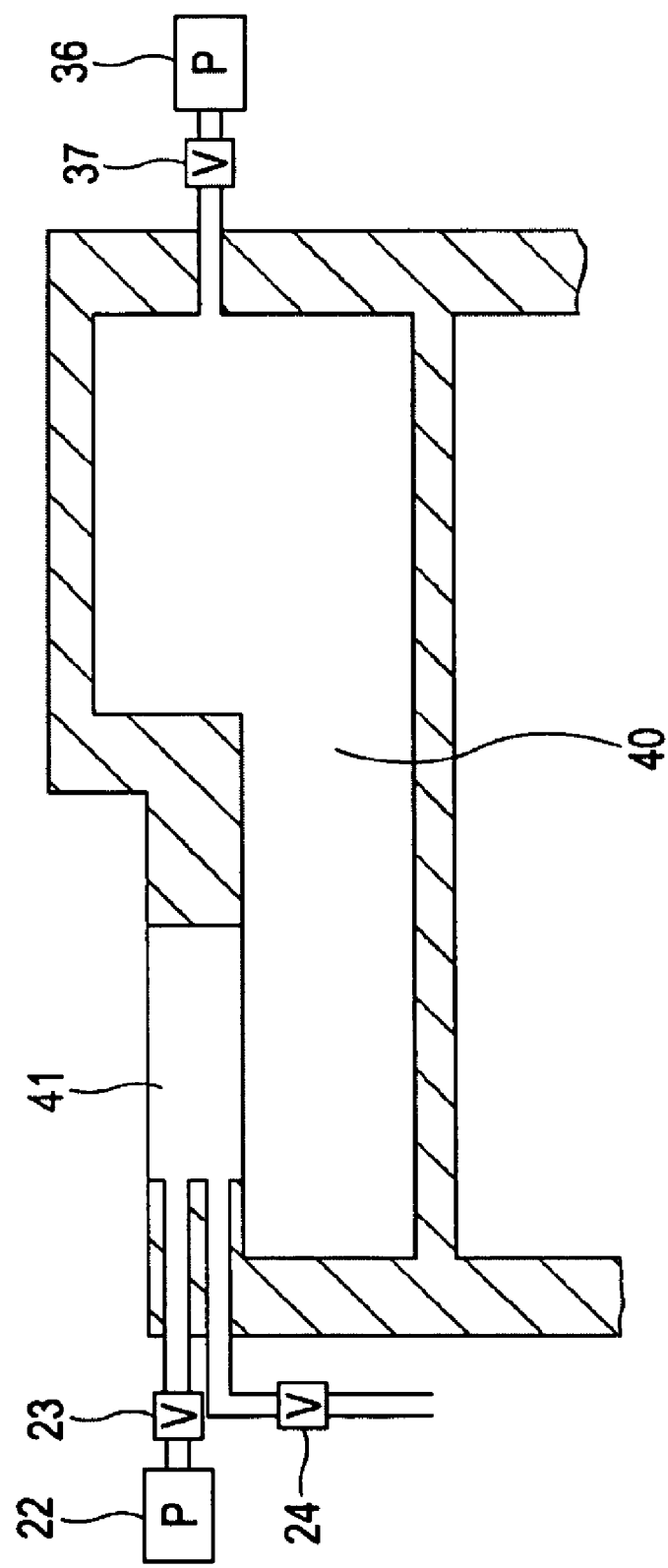
FIG. 5 is an explanatory view showing a structure of vacuum chambers in the vacuum transfer apparatus according to the embodiment.

The vacuum transfer apparatus of the embodiment has a structure including therein a main vacuum chamber 40 and an auxiliary vacuum chamber 41. FIG. 5 simply illustrates spaces serving as the main vacuum chamber 40 and the auxiliary vacuum chamber 41 while other structure portions in FIG. 4 are omitted.

The main vacuum chamber 40 has a relatively large space in which transfer is actually performed using a L1-layer stamper 50.

A vacuum pump 36 is connected to the main vacuum chamber 40 with a vacuum valve 37 interposed therebetween. The vacuum pump 36 performs vacuum suction, and hence, the main vacuum chamber 40 can be continuously in vacuum. For example, the vacuum state is a value in a range of from about 30 to about $1\times10^{-2}$ Pa, which is desirable for the vacuum transfer operation.

The auxiliary vacuum chamber 41 is a space through which the disk substrate 1 passes when the disk substrate 1 is conveyed to and from the vacuum transfer apparatus. As shown in FIG. 5, the auxiliary vacuum chamber 41 has a relatively small spatial volume as compared with the main vacuum chamber 40.

A vacuum pump 22 is connected to the auxiliary vacuum chamber 41 with a vacuum valve 23 interposed therebetween. The vacuum pump 22 performs vacuuming by vacuum suction. The auxiliary vacuum chamber 41 is a space not for actually performing the stamper transfer operation. Thus, the degree of vacuum of the auxiliary vacuum chamber 41 may be relatively low as, for example, a value in a range of from about 100 to about 50 Pa.

The auxiliary vacuum chamber 41 is opened to air by opening an air valve 24.

As shown in FIG. 4, a substrate conveying unit 20 is provided to convey the disk substrate 1 to and from the vacuum transfer apparatus.

The substrate conveying unit 20 conveys the disk substrate 1 from a previous process to the vacuum transfer apparatus by way of a mechanism (not shown), and conveys the disk substrate 1 removed from the vacuum transfer apparatus to a next process.

The substrate conveying unit 20 is located above the auxiliary vacuum chamber 41 during the process in the vacuum transfer apparatus. The substrate conveying unit 20 has a cylinder portion driven by an open/close motor 21, and a portion for gripping the disk substrate 1, the portion which is lifted and lowered with respect to the auxiliary vacuum chamber 41. When the substrate conveying unit 20 is lowered to a position where the substrate conveying unit 20 comes into contact with an upper side of the auxiliary vacuum chamber 41, the substrate conveying unit 20 serves as an upper wall defining a sealed space of the auxiliary vacuum chamber 41.

A conveying table 25 is disposed in the main vacuum chamber 40. The conveying table 25 is rotated by a conveying motor 29.

On the upper side of the conveying table 25, two holding tables 26A and 26B are mounted as illustrated.

In this illustrated state, the holding table 26A is located on the conveying table 25, and below the auxiliary vacuum chamber 41, whereas the holding table 26B is located on the conveying table 25, and below a transfer unit 30.

It is noted that a structure portion including the auxiliary vacuum chamber 41 and a left half of the main vacuum chamber 40 arranged at the left side of the drawing is referred to as an "auxiliary-vacuum-chamber side", and a structure portion including a right half of the main vacuum chamber 40 arranged at the right side of the drawing is referred to as a "transfer-unit side".

The conveying motor 29 rotates the conveying table 25 by 180° during the conveyance of the substrate. Every time when the conveying table 25 is rotated by 180°, the positions of the holding tables 26A and 26B are switched between the auxiliary-vacuum-chamber side and the transfer-unit side.

The holding tables 26A and 26B are made of a UV-transmissive material such as silica glass. The holding tables 26A and 26B are circular planes having a size equal to or larger than a diameter of the disk substrate 1.

The conveying table 25 has holes Ha and Hb at positions below the mounting positions of the holding tables 26A and 26B.

Also, a holding-table lift unit 27 is disposed at a lower portion at the auxiliary-vacuum-chamber side in the main vacuum chamber 40. The holding-table lift unit 27 is lifted and lowered by a table lift motor 28.

In the state shown in FIG. 4, the holding table 26A is located at the auxiliary-vacuum-chamber side. In this state, if the holding-table lift unit 27 is lifted, the holding-table lift unit 27 passes through the hole Ha and lifts the holding table 26A from the conveying table 25.

In this case, the holding table 26A is pushed upward to come into contact with the auxiliary vacuum chamber 41. When the holding table 26A is lifted to a position where the holding table 26A comes into contact with a lower side of the auxiliary vacuum chamber 41, the holding table 26A serves as a lower wall defining the sealed space of the auxiliary vacuum chamber 41.

If the holding table 26B is located at the auxiliary-vacuum-chamber side, the holding-table lift unit 27 passes through the hole Hb and comes into contact with the holding table 26B. Accordingly, the holding table 26B is lifted and lowered.

In addition, a shaft 25a protruding from the conveying table 25 is inserted through the holding table 26A, and a shaft 25b protruding from the conveying table 25 is inserted through the holding table 26B. The holding tables 26A and 26B vertically move respectively along the shafts 25a and 25b.

The transfer unit 30 is arranged such that a stamper holder 32 is located in the main vacuum chamber 40.

The stamper holder 32 holds a L1-layer stamper 50 with a transfer surface of the L1-layer stamper 50 facing the lower side. The L1-layer stamper 50 is a stamper having a transfer surface of a pit pattern of the L1 layer as mentioned above. For example, the L1-layer stamper 50 is desirably a metal stamper made of nickel or the like. Alternatively, the L1-layer stamper 50 may be a glass stamper, or a resin stamper.

The stamper holder 32 is mounted to a holder lift unit 33. The holder lift unit 33 is lifted and lowered by a transfer motor 31, and accordingly, the stamper holder 32 is lifted and lowered. With lowering, the L1-layer stamper 50 held by the stamper holder 32 is lowered to a transfer position where the L1-layer stamper 50 is pressed to the disk substrate 1 mounted on the holding table 26 (in the drawing, holding table 26B), and with lifting, the L1-layer stamper 50 is lifted to the initial position in the drawing.

Also, an ejector pin 34 is provided. The ejector pin 34 is lowered by a pin lift motor 35. The ejector pin 34 has a function of pressing the disk substrate 1 when the L1-layer stamper 50 is to be removed from the disk substrate 1. In particular, when the ejector pin 34 is lowered, the ejector pin 34 passes through a center hole portion of the L1-layer stamper 50, and presses a peripheral portion of a center hole of the disk substrate 1, which is located below the center hole portion of the L1-layer stamper 50.

A UV irradiation unit 38 is provided below the main vacuum chamber 40 at the transfer-unit side provided with the transfer unit 30.

UV from at least the UV irradiation unit 38 is transmitted through the hole (Ha or Hb) of the conveying table 25, and then through the holding table (26A or 26B) made of the UV-transmissive material. The layer of the UV-curable resin of the disk substrate 1 mounted on the holding table (26A or 26B) is irradiated with the UV.

The process using the vacuum transfer apparatus is described below.

The disk substrate 1 to be conveyed to the vacuum transfer apparatus is a disk substrate in which the L0 layer is formed thereon as shown in FIG. 2C, and then the uncured UV-curable resin is spread on the surface of the L0-layer reflecting film 4 by spin coating. The UV-curable resin is resin to be the spacer layer 5.

Also, the disk substrate 1 to be conveyed from the vacuum transfer apparatus after the process in the vacuum transfer apparatus is a disk substrate in which the spacer layer (intermediate layer) 5 and the L1 pit pattern 6 are formed as shown in FIG. 3A.

Figure 6:
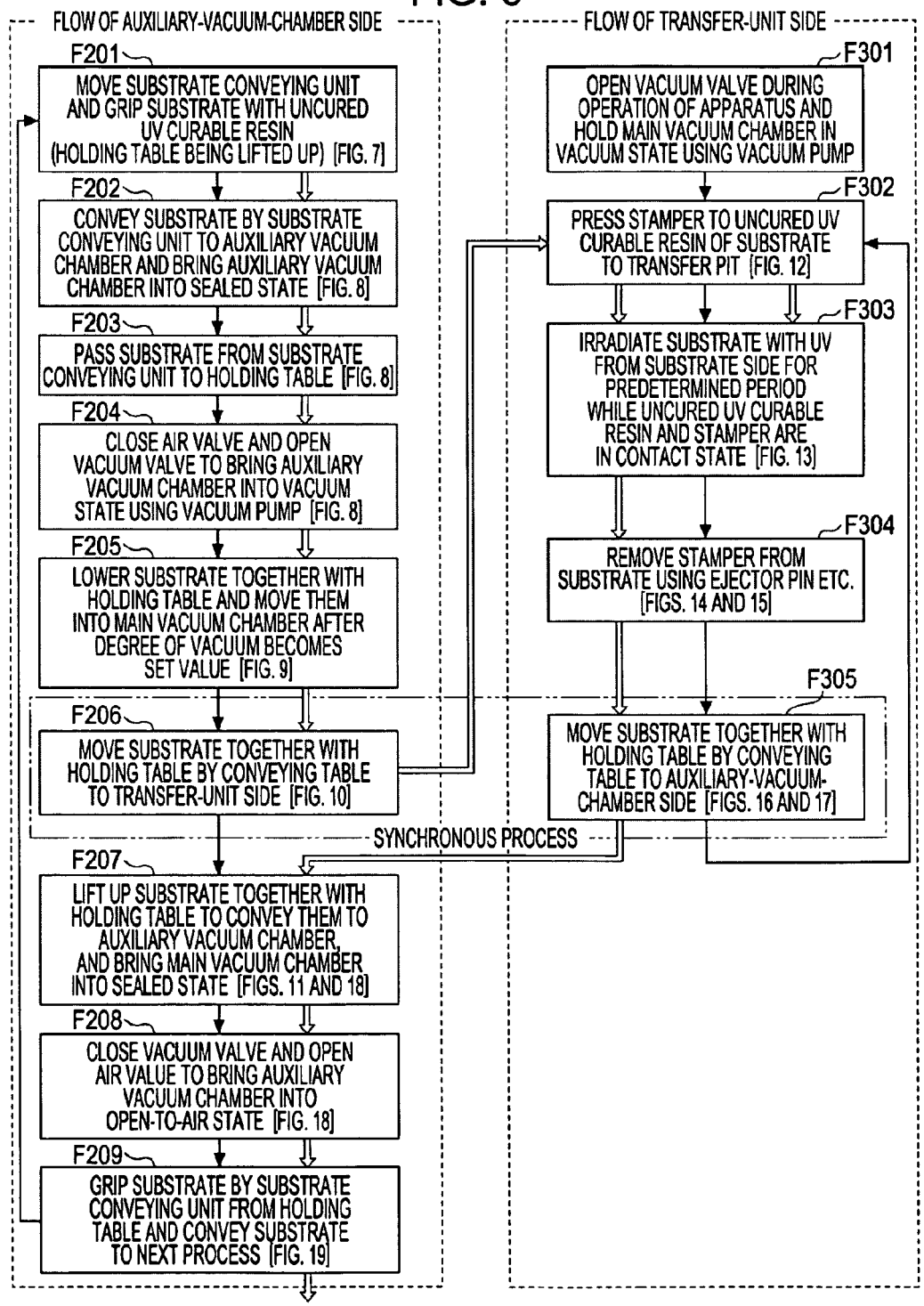
FIG. 6 is a flowchart showing a process of forming a spacer layer and a L1 layer with the vacuum transfer apparatus according to the embodiment.

FIG. 6 is a flowchart showing the process performed at the auxiliary-vacuum-chamber side and the process performed at the transfer-unit side. The process including steps F201 to F209 at the auxiliary-vacuum-chamber side and the process including steps F302 to 305 at the transfer-unit side are performed in parallel for sequentially conveyed disk substrates 1. Regarding a single disk substrate 1, the processes are performed in the order indicated by double-line arrow in FIG. 6. In particular, the order is: steps F201 to F206, F302 to F305, and then F207 to F209.

Figure 7:
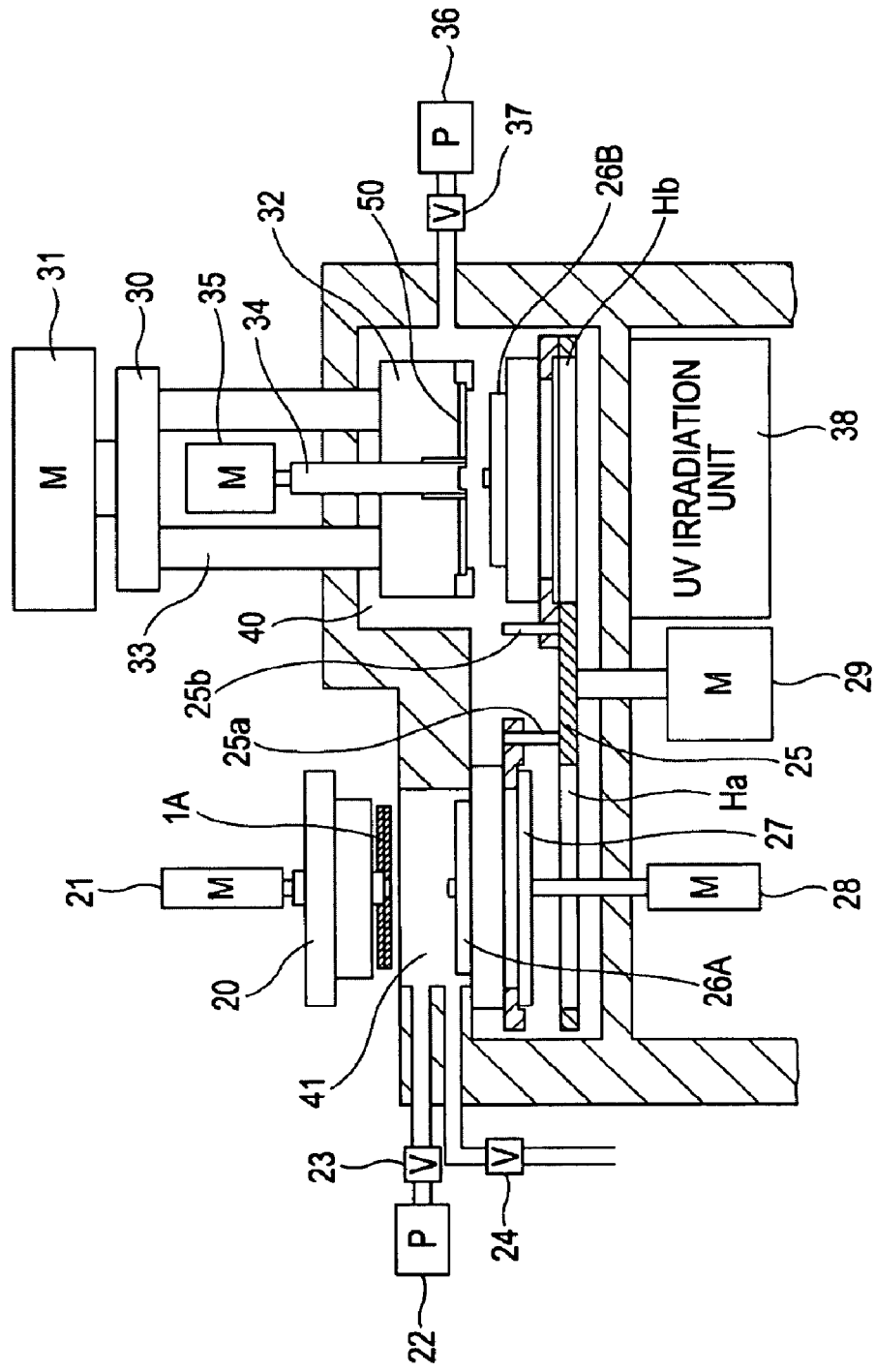
FIG. 7 is an explanatory view showing that a disk substrate is conveyed to the vacuum transfer apparatus according to the embodiment.

Referring to FIG. 7 and other subsequent figures, the process will be described as a flow indicated by double-line arrow, for a single disk substrate 1A from conveyance to the vacuum transfer apparatus, to conveyance from the vacuum transfer apparatus. Meanwhile, an equivalent process is performed in parallel when a next disk substrate 1B is conveyed to the vacuum transfer apparatus. The process performed in parallel will be described after the description of the process for the disk substrate 1A.

Steps in FIG. 6 are respectively accompanied by corresponding figure numbers of FIGS. 7 to 19.

When the vacuum transfer apparatus is operated, in step F301, the main vacuum chamber 40 is vacuumized. In particular, the vacuum valve 37 is opened, vacuuming is performed by the vacuum pump 36, and accordingly, the main vacuum chamber 40 is vacuumized. The vacuuming is continuously or intermittently performed during the operation, so that the main vacuum chamber 40 has a predetermined degree of vacuum.

It is assumed that a disk substrate 1A shown in FIG. 7 and other subsequent figures is a disk substrate which is firstly conveyed to the vacuum transfer apparatus since the operation is started. Also, it is assumed that a disk substrate 1B shown in FIG. 13 and other subsequent figures is a disk substrate which is secondly conveyed to the vacuum transfer apparatus.

In step F201, the substrate conveying unit 20 conveys the disk substrate 1A with uncured UV-curable resin applied in the previous step, to a position above the auxiliary vacuum chamber 41.

That is, as shown in FIG. 7, a single disk substrate 1A is conveyed to the position above the auxiliary vacuum chamber 41 from the previous step. At this time, the substrate conveying unit 20 grips and conveys the disk substrate 1A such that a surface with the UV-curable resin applied faces the upper side.

In this state, the holding table 26A is lifted by the holding-table lift unit 27 to a position where the holding table 26A defines the lower wall of the auxiliary vacuum chamber 41.

Figure 8:
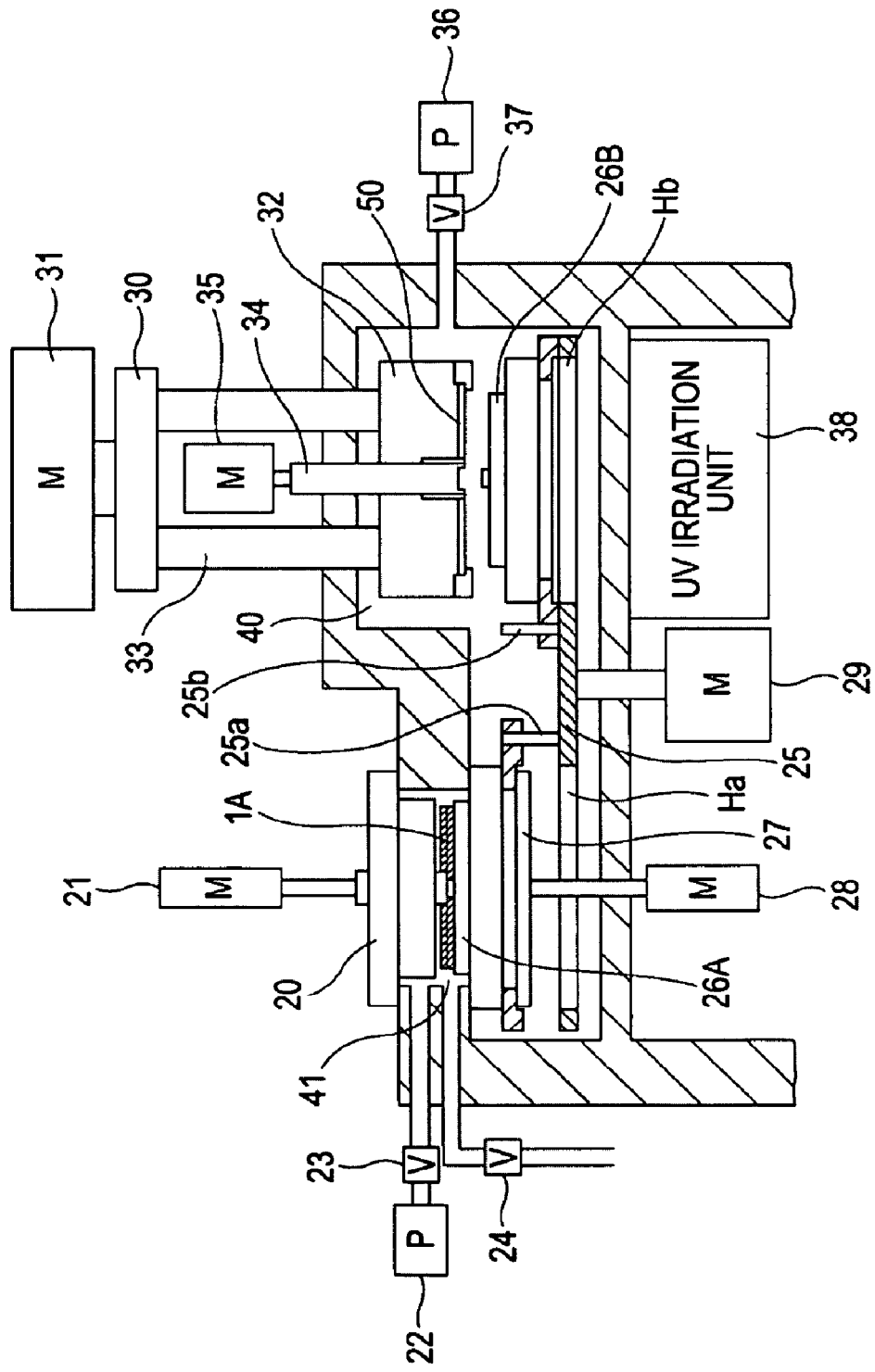
FIG. 8 is an explanatory view showing that the disk substrate is conveyed to an auxiliary vacuum chamber in the vacuum transfer apparatus according to the embodiment.

Then, in step F202, the disk substrate 1A is conveyed to the auxiliary vacuum chamber 41. In particular, as shown in FIG. 8, the substrate conveying unit 20 is lowered by the open/close motor 21, and accordingly, the disk substrate 1A gripped by the substrate conveying unit 20 enters the internal space of the auxiliary vacuum chamber 41.

At this time, the substrate conveying unit 20 is lowered to a position where the substrate conveying unit 20 comes into contact with the upper surface side of the auxiliary vacuum chamber 41, and accordingly, the substrate conveying unit 20 defines the lower wall of the auxiliary vacuum chamber 41. Since the holding table 26A and the substrate conveying unit 20 close the upper and lower sides of the auxiliary vacuum chamber 41, the auxiliary vacuum chamber 41 becomes a sealed space. Note that the air valve 24 is open in this state.

In step F203, the substrate conveying unit 20 passes the disk substrate 1A to the holding table 26A. As shown in FIG. 8, while the substrate conveying unit 20 is lowered, the disk substrate 1A is being mounted on the upper surface of the lifted holding table 26A. Hence, the substrate conveying unit 20 passes the disk substrate 1A to the holding table 26A by releasing the gripping of the disk substrate 1A.

In step F204, the auxiliary vacuum chamber 41 is vacuumized. In particular, the air valve 24 is closed so that the auxiliary vacuum chamber 41 is completely sealed. Then, the vacuum valve 23 is opened and vacuuming is performed by the vacuum pump 22.

If the auxiliary vacuum chamber 41 obtains a predetermined degree of vacuum (for example, about 50 Pa) by vacuuming, in step F205, the holding table 26A is lowered, and the disk substrate 1A is conveyed to the main vacuum chamber 40.

Figure 9:
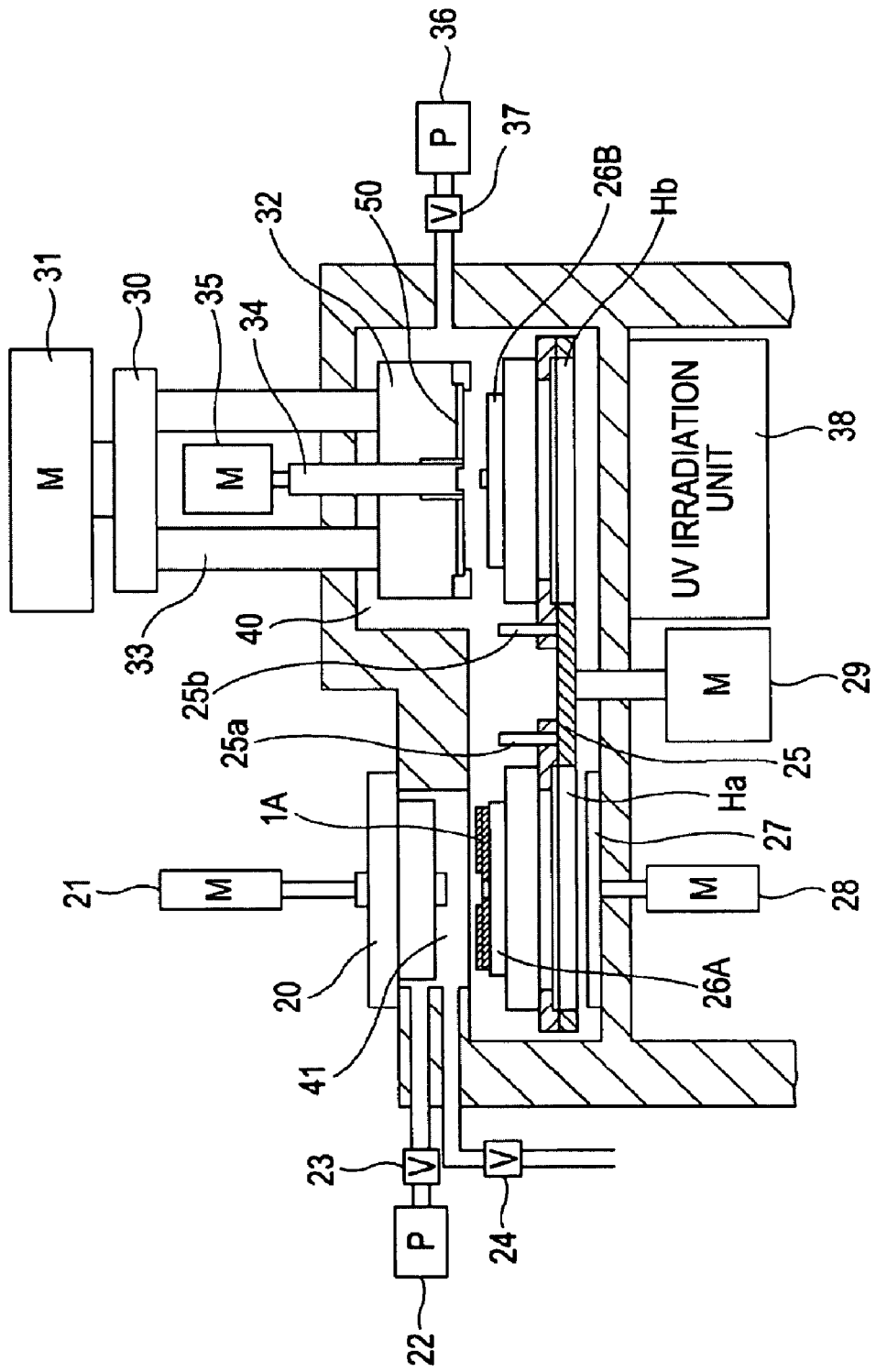
FIG. 9 is an explanatory view showing that the disk substrate is conveyed to a main vacuum chamber in the vacuum transfer apparatus according to the embodiment.

In particular, as shown in FIG. 9, the holding-table lift unit 27 lowers the holding table 26A. Accordingly, the disk substrate 1A mounted on the holding table 26A enters the main vacuum chamber 40. The holding table 26A is being mounted on the upper surface of the conveying table 25.

At this time, the auxiliary vacuum chamber 41 spatially communicates with the main vacuum chamber 40. Since the degree of vacuum of the auxiliary vacuum chamber 41 is lower than that of the main vacuum chamber 40, the degree of vacuum of the main vacuum chamber 40 may be slightly decreased at a moment. However, the main vacuum chamber 40 performs vacuuming continuously or at a necessary timing with the vacuum pump 36. Accordingly, the degree of vacuum is immediately recovered to a necessary level.

Alternatively, the main vacuum chamber 40 may have a higher degree of vacuum. Thus, the main vacuum chamber 40 can maintain a necessary degree of vacuum or higher even while the main vacuum chamber 40 communicates with the auxiliary vacuum chamber 41.

In step F206, the disk substrate 1A is conveyed to the transfer-unit side together with the holding table 26A. In particular, the conveying motor 29 rotates the conveying table 25 by 180°, so that the state in FIG. 9 is shifted to the state in FIG. 10. The holding table 26A and the disk substrate 1A are moved to the transfer-unit side in the main vacuum chamber 40.

In this state, step F302 and subsequent steps are performed as the process at the transfer-unit side for the disk substrate 1A.

Figure 12:
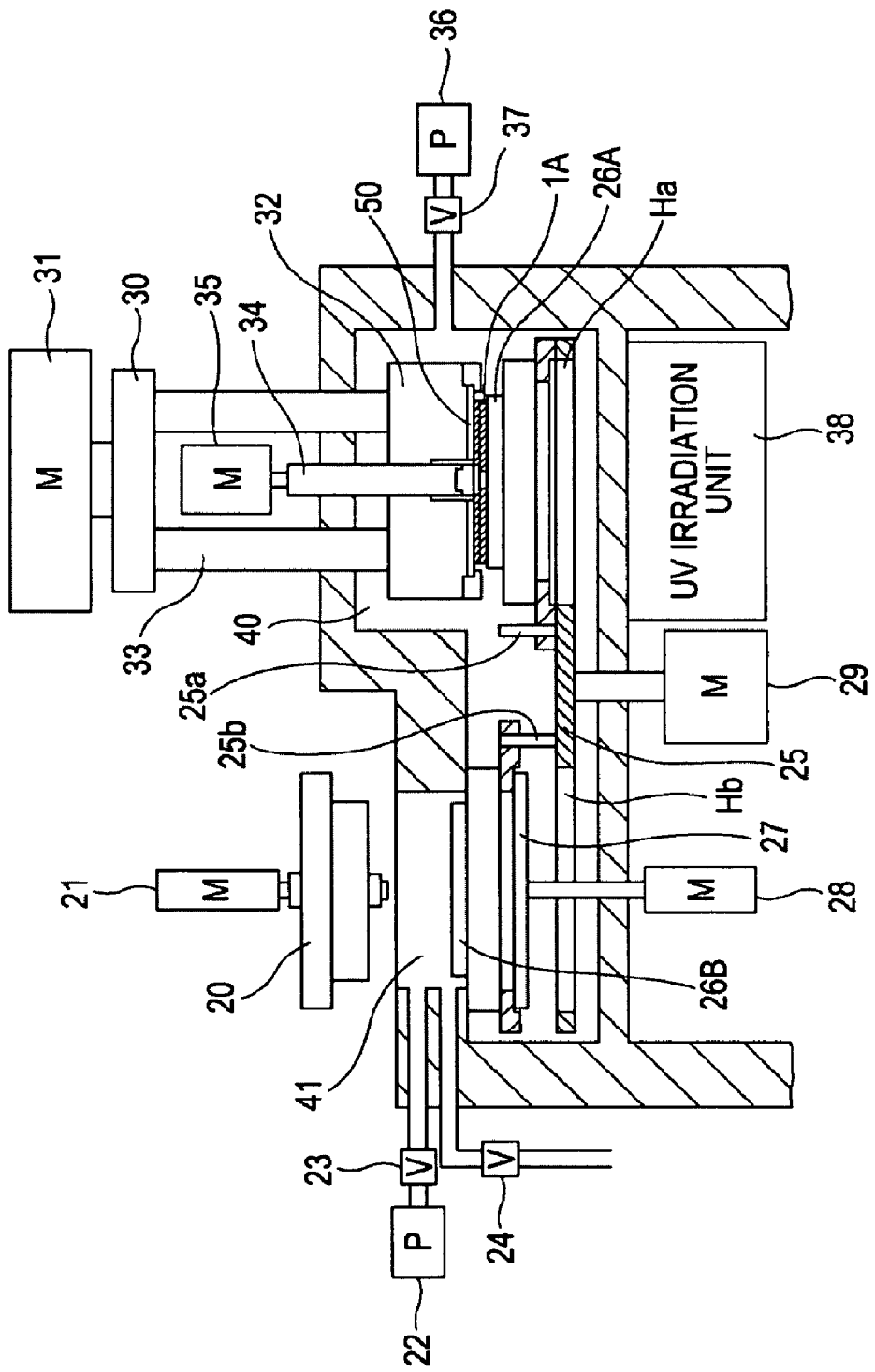
FIG. 12 is an explanatory view showing an operation during transfer in the vacuum transfer apparatus according to the embodiment.

In step F302, a stamper (in this case, L1-layer stamper 50) is pressed to the layer of the uncured UV-curable resin on the disk substrate 1A, so as to transfer an uneven pattern as a pit pattern. In particular, as shown in FIG. 12, the transfer motor 31 lowers the holder lift unit 33, thereby lowering the L1-layer stamper 50 held by the stamper holder 32, and the L1-layer stamper 50 is pressed to the layer of the UV-curable resin on the disk substrate 1A.

Figure 13:
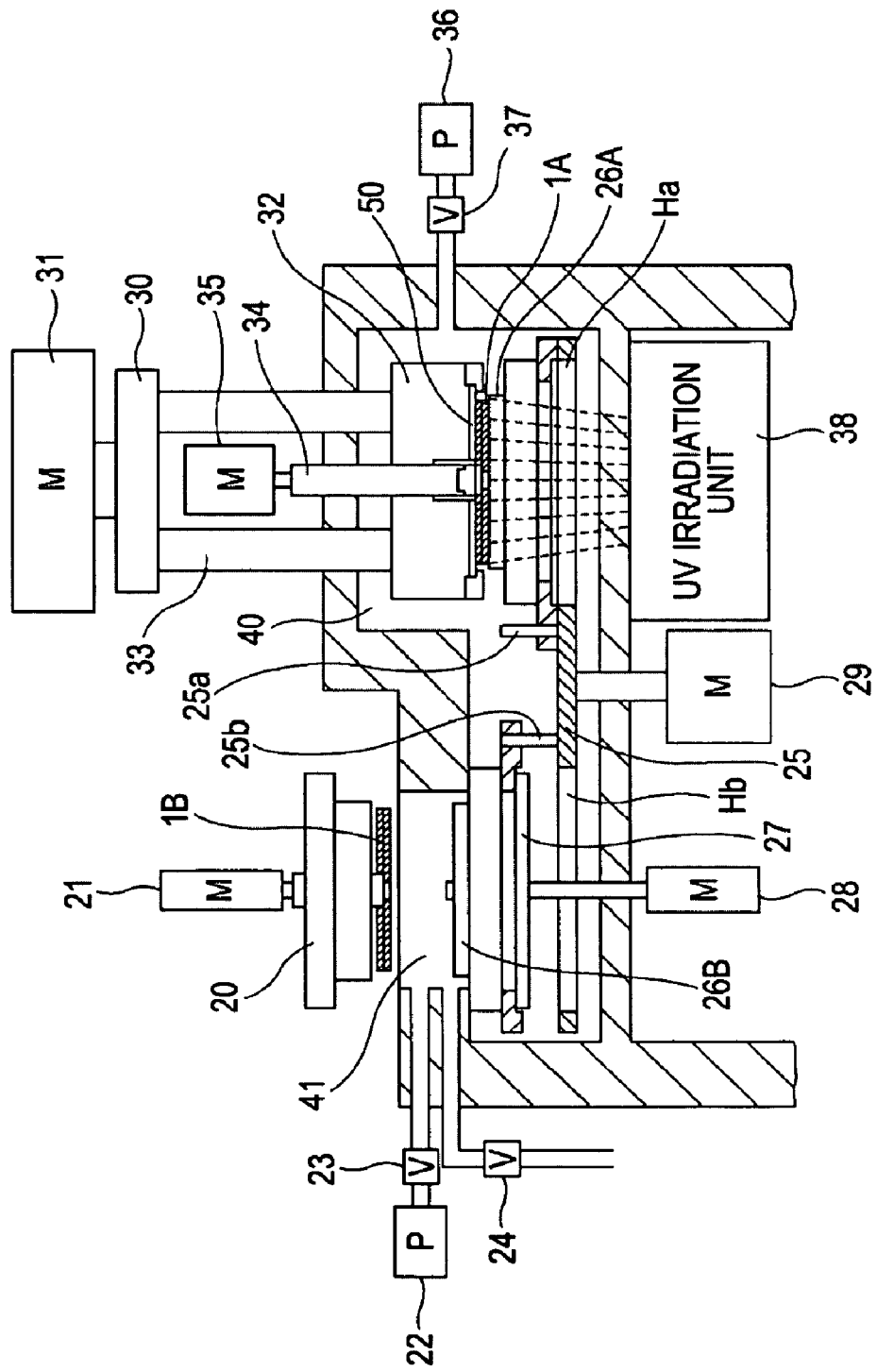
FIG. 13 is an explanatory view showing an operation during UV irradiation in the vacuum transfer apparatus according to the embodiment.

Then, in step F303, UV irradiation is performed for a predetermined period to cure the UV-curable resin. In this case, as shown in FIG. 13, UV irradiation is performed, from the UV irradiation unit 38 located below the disk substrate 1A while the L1-layer stamper 50 is pressed to the disk substrate 1A. Ultraviolet is transmitted through the hole Ha, the holding table 26A made of a UV-transmissive material, and the disk substrate 1A made of transparent polycarbonate, reaches the UV-curable resin applied on the surface of the disk substrate 1A, and cures the UV-curable resin.

Alternatively, the L1-layer stamper 50 and the disk substrate 1A may be lifted from the holding table 26A while the L1-layer stamper 50 and the disk substrate 1A are in a closely contact state, and UV irradiation may be performed while the disk substrate 1A and the holding table 26A are in a non-contact state.

After the UV-curable resin is cured, the L1-layer stamper 50 is removed from the disk substrate 1A in step F304.

Figure 14:
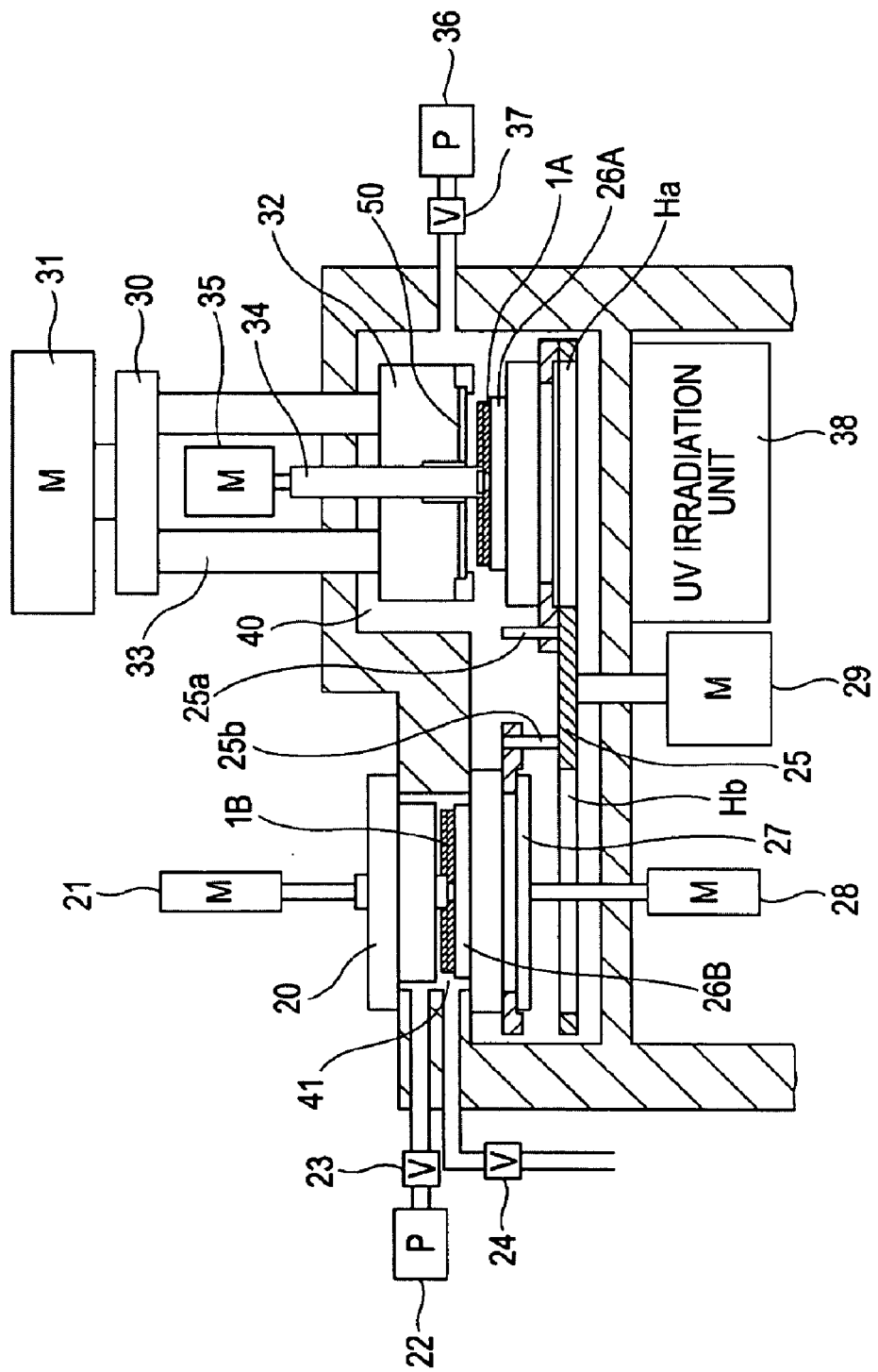
FIG. 14 is an explanatory view showing an operation during removal of a stamper in the vacuum transfer apparatus according to the embodiment.

In particular, as shown in FIG. 14, the pin lift motor 35 lowers the ejector pin 34, so that the ejector pin 34 passes through the center hole of the L1-layer stamper 50, and presses a peripheral portion of a center hole of the disk substrate 1A.

In this state, the transfer motor 31 lifts the holder lift unit 33, so as to lift the stamper holder 32. Accordingly, the L1-layer stamper 50 is removed from the disk substrate 1A.

After the L1-layer stamper 50 is removed from the disk substrate 1A, the disk substrate 1A is conveyed to the auxiliary-vacuum-chamber side in step F305.

While the above-described process including steps F302, F303, and then F304 is performed at the transfer-unit side, the process including steps F207, F208, F209, F201, F202, F203, F204, and then F205 is performed at the auxiliary-vacuum-chamber side. Although the details are described later, a next disk substrate 1B is being mounted on the holding table 26B as shown in FIG. 16 when the disk substrate 1A is conveyed to the auxiliary-vacuum-chamber side in step F305.

Figure 16:
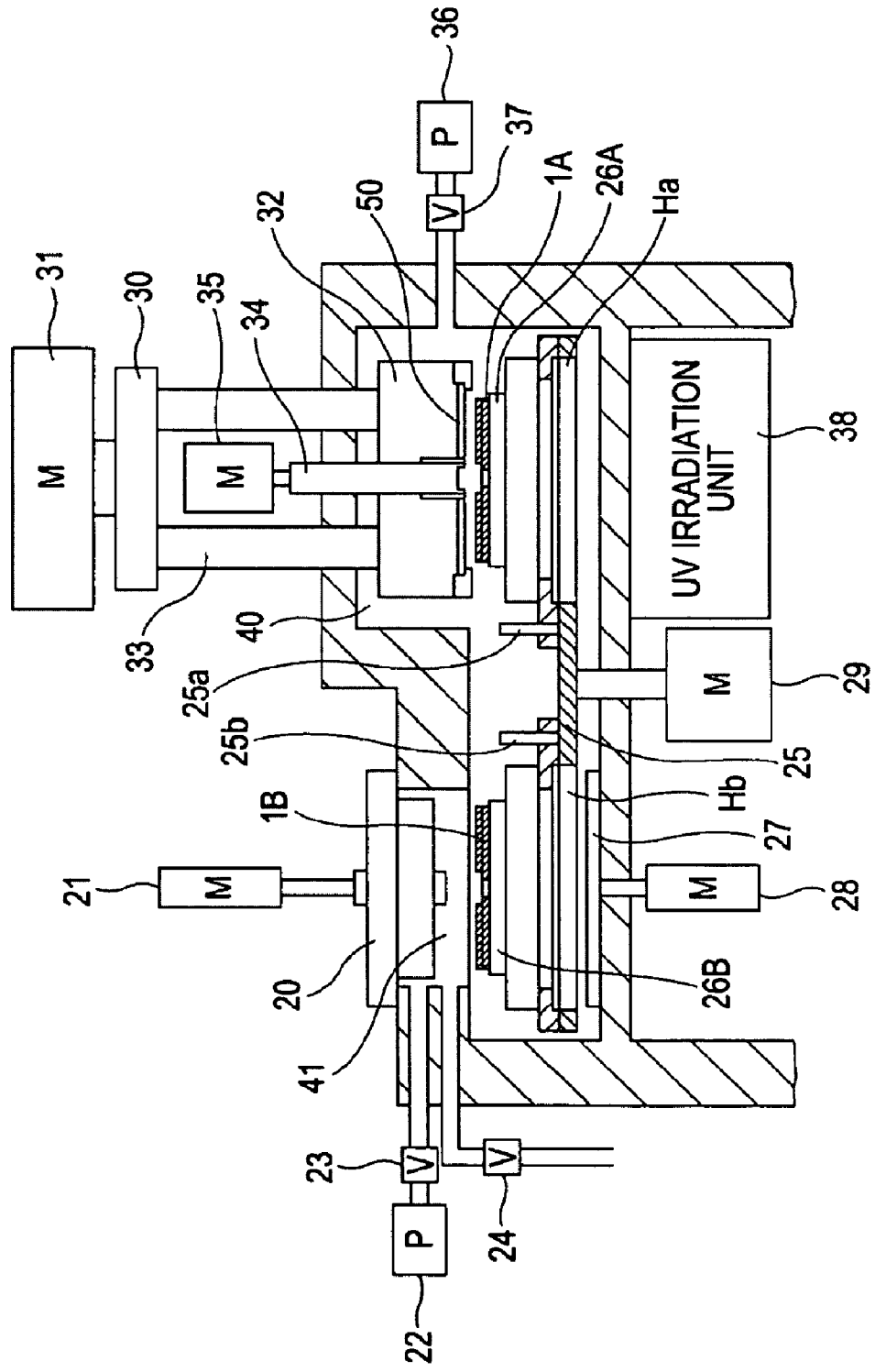
FIG. 16 is an explanatory view showing an operation at the auxiliary-vacuum-chamber side in the vacuum transfer apparatus according to the embodiment.
Figure 17:
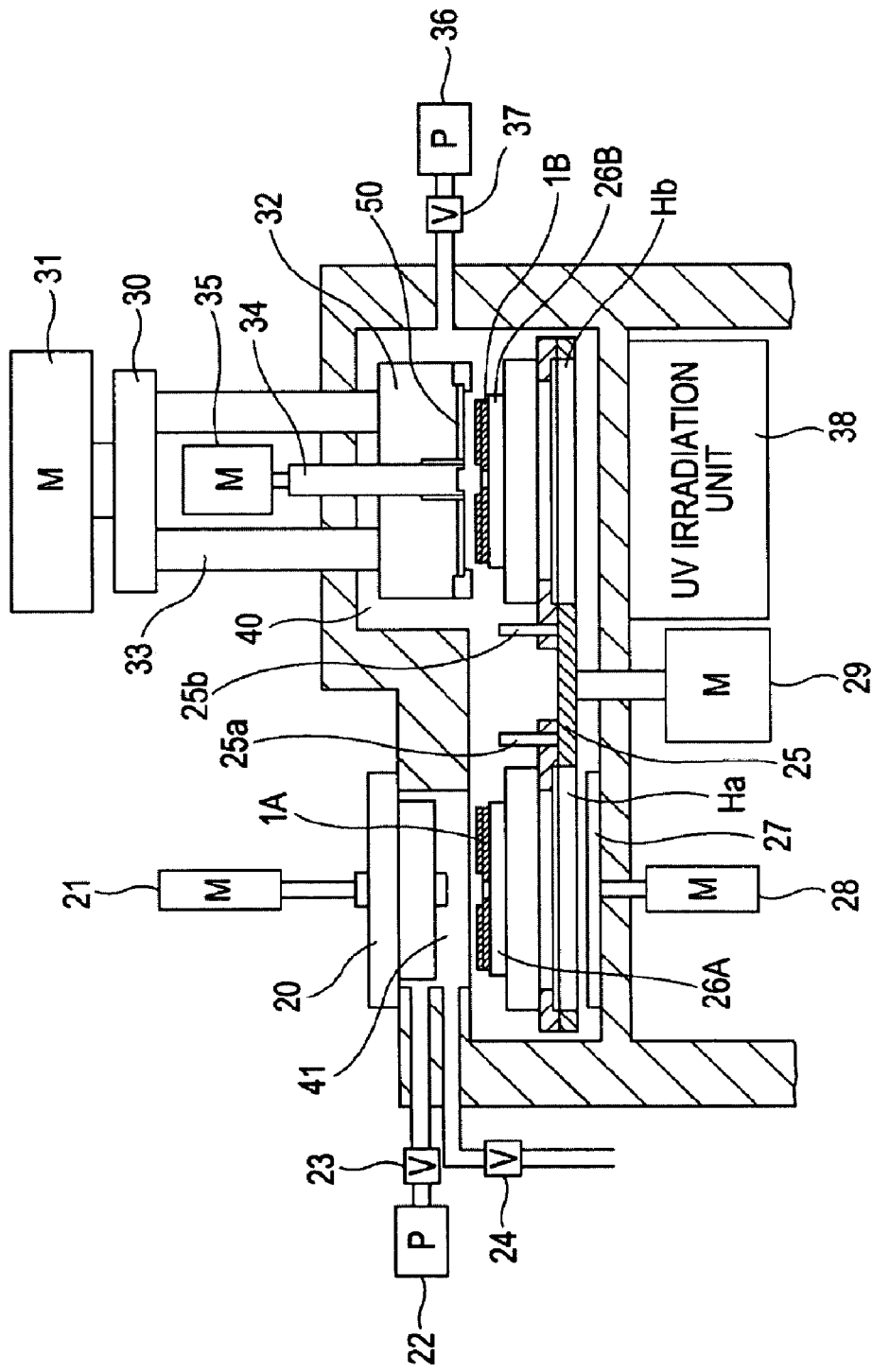
FIG. 17 is an explanatory view showing conveyance of disk substrates at the auxiliary-vacuum-chamber side and the transfer-unit side in the vacuum transfer apparatus according to the embodiment.

In step F305, the conveying motor 29 rotates the conveying table 25 by 180°, so that the state in FIG. 16 is shifted to the state in FIG. 17. The holding table 26A and the disk substrate 1A are moved to the auxiliary-vacuum-chamber side in the main vacuum chamber 40. Synchronously to this, the next disk substrate 1B is moved to the transfer-unit side in the main vacuum chamber 40 together with the holding table 26B.

Figure 18:
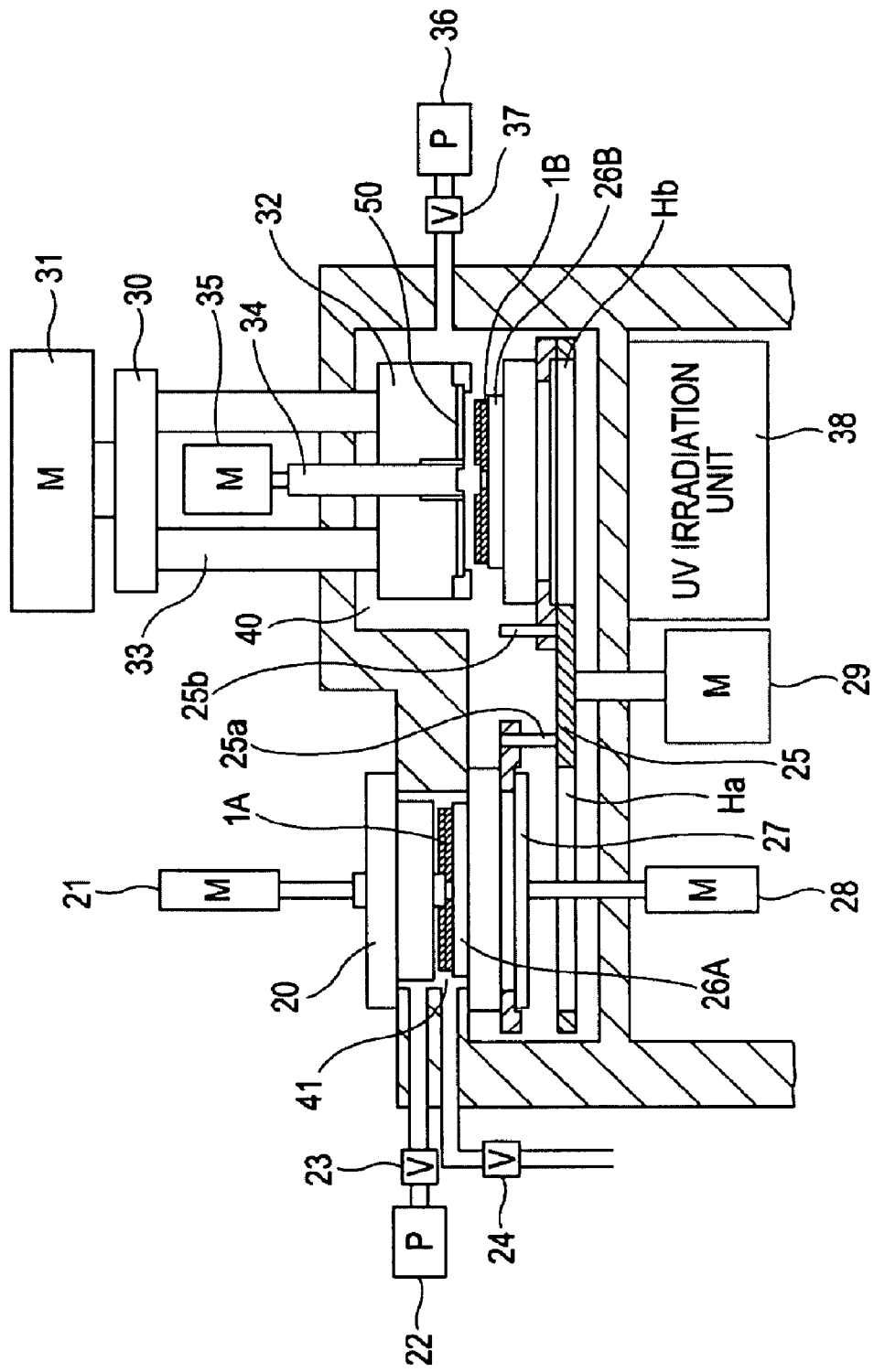
FIG. 18 is an explanatory view showing conveyance of the disk substrate to the auxiliary vacuum chamber in the vacuum transfer apparatus according to the embodiment.

Regarding the disk substrate 1A, the disk substrate 1A is then conveyed to the auxiliary vacuum chamber 41 in step F207. In particular, as shown in FIG. 18, the holding-table lift unit 27 lifts the holding table 26A with the disk substrate 1A mounted. Accordingly, the disk substrate 1A enters the auxiliary vacuum chamber 41. The holding table 26A at this time defines the lower wall of the auxiliary vacuum chamber 41. Also, as shown in the drawing, the substrate conveying unit 20 defines the upper wall of the auxiliary vacuum chamber 41. Hence, the auxiliary vacuum chamber 41 is sealed.

Figure 19:
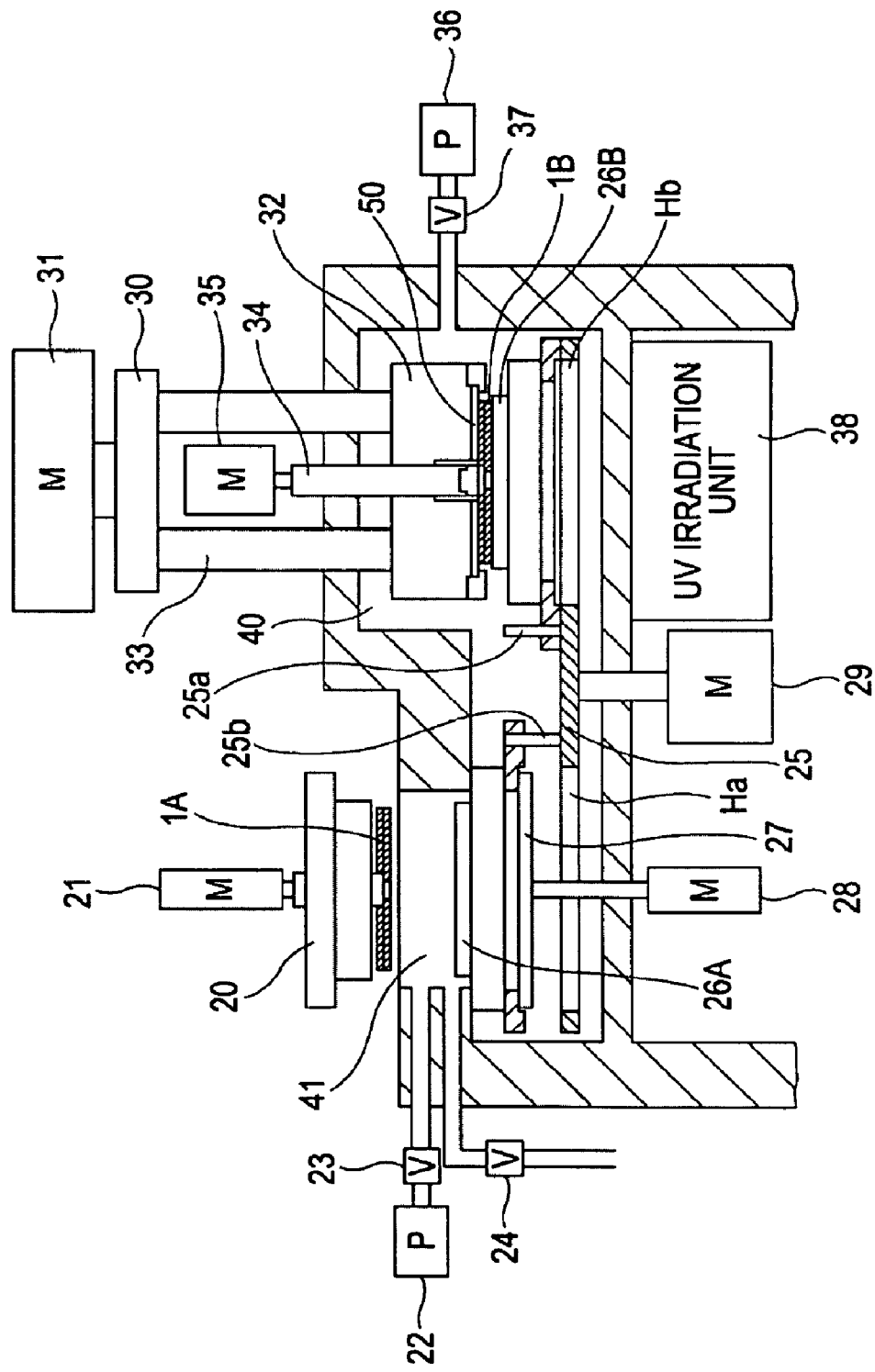
FIG. 19 is an explanatory view showing a condition that the disk substrate is conveyed from the vacuum transfer apparatus according to the embodiment.

In step F208, the air valve 24 is opened, so that the auxiliary vacuum chamber 41 is opened to air. Then, in step F209, the substrate conveying unit 20 grips the disk substrate 1A, is lifted by the open/close motor 21 as shown in FIG. 19, and then conveys the disk substrate 1A to a next process.

As described above, the disk substrate 1A conveyed from the vacuum transfer apparatus after the series of steps are performed in the vacuum transfer apparatus becomes the disk substrate with the spacer layer 5 and the L1 pit pattern 6 formed as shown in FIG. 3A.

Regarding the disk substrate 1A, the process of forming the spacer layer and the L1 layer in step F103 in FIG. 1 is completed, and then, the procedure goes to the process of step F104 in FIG. 1 and subsequent steps, thereby manufacturing an optical disk as described above.

Regarding a single disk substrate 1A, the above steps are performed. Description is given for the steps performed in parallel at the auxiliary-vacuum-chamber side and the transfer-unit side when the next disk substrate 1B is conveyed.

Figure 10:
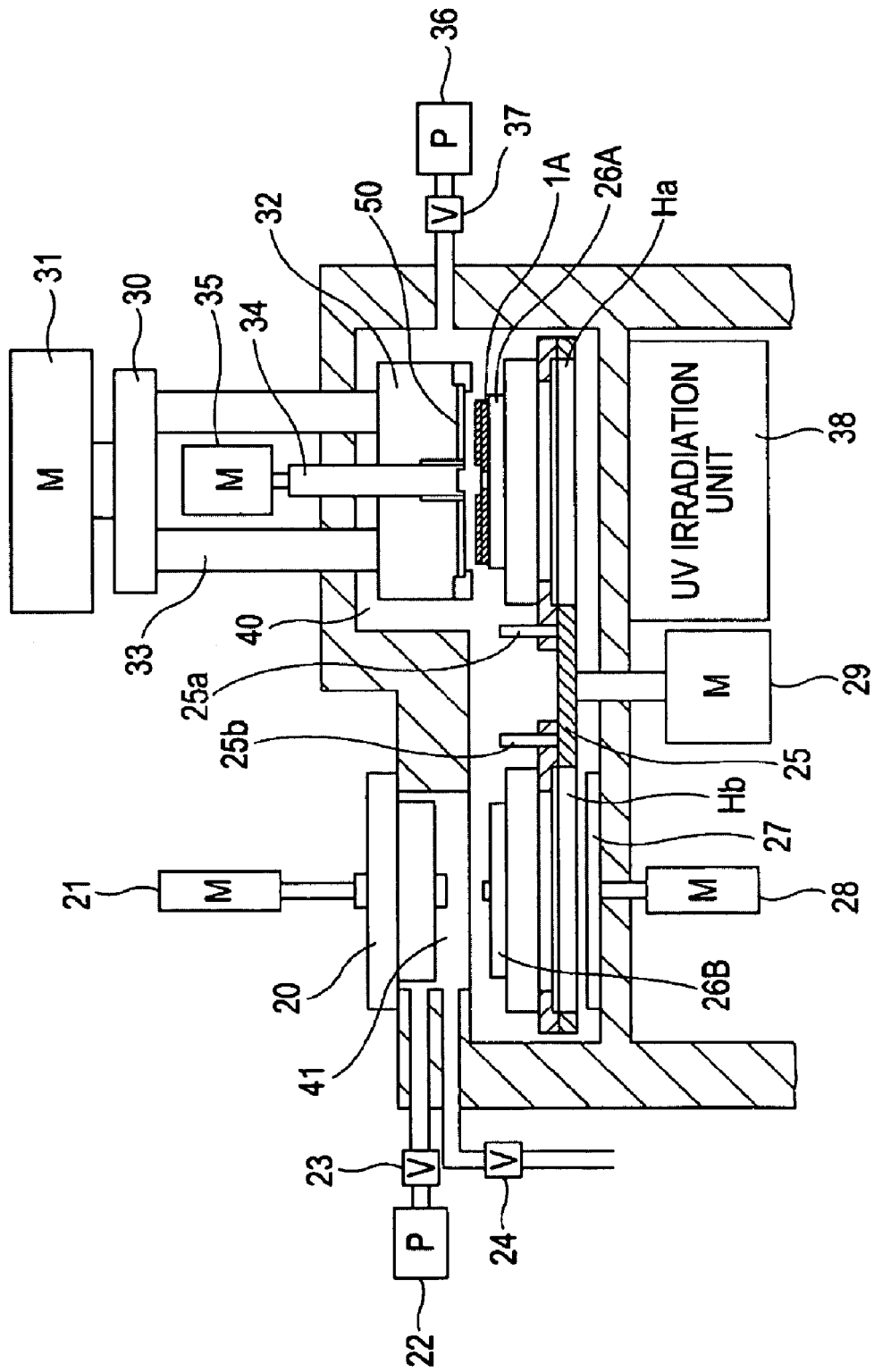
FIG. 10 is an explanatory view showing a condition that the disk substrate is conveyed to a transfer-unit side in the vacuum transfer apparatus according to the embodiment.

It is assumed that the above-described disk substrate 1A is a first disk substrate to be processed since the operation is started. FIG. 10 shows that the disk substrate 1A is conveyed to the transfer-unit side after steps F201 to F206 are performed for the disk substrate 1A.

Herein, steps F302 (stamper pressing in FIG. 12), F303 (UV irradiation in FIG. 13), and F304 (stamper removal in FIG. 14) are performed at the transfer-unit side as described above, and in parallel to these steps, the operation in step F207 and subsequent steps are performed at the auxiliary-vacuum-chamber side.

Figure 11:
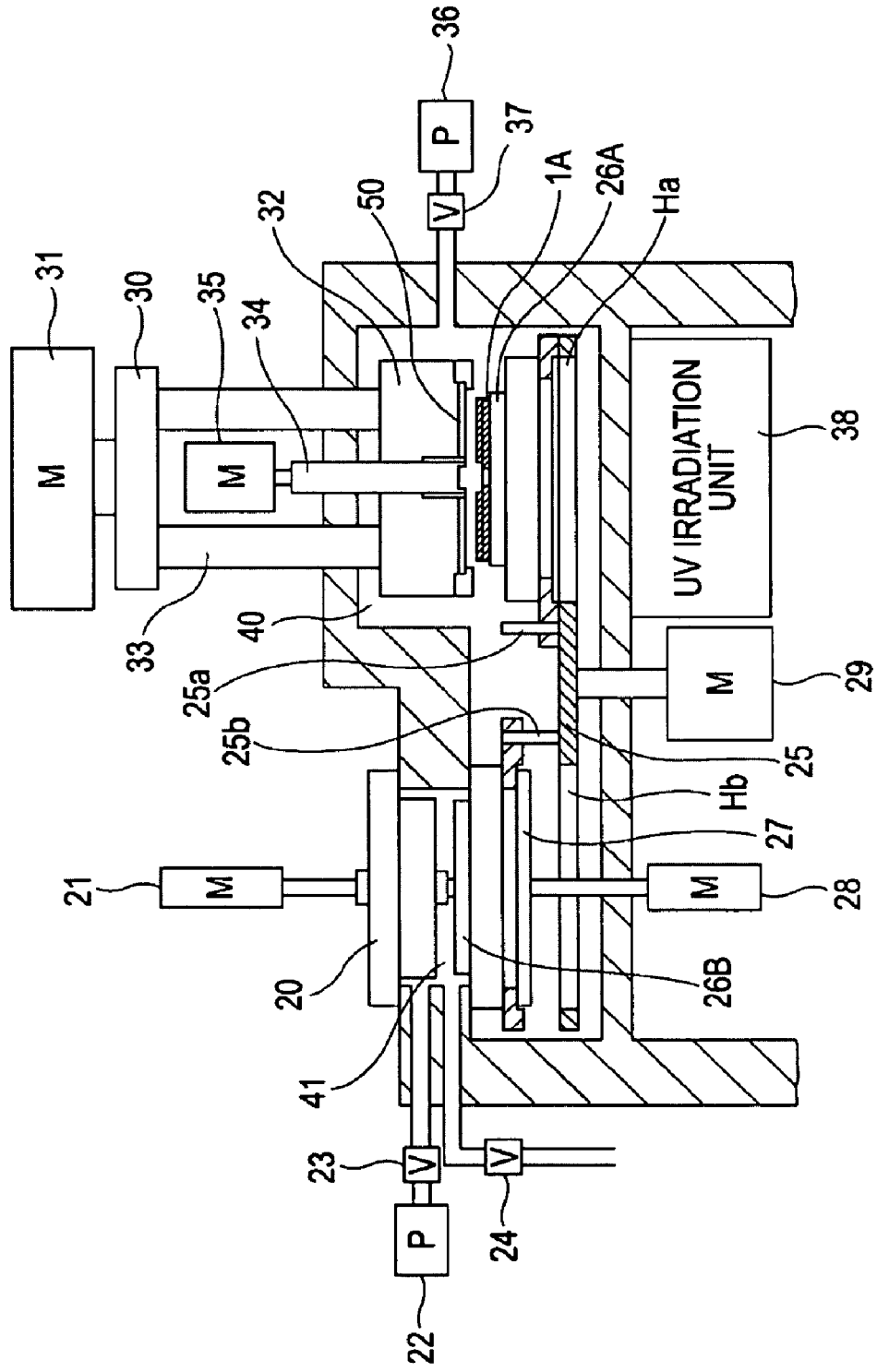
FIG. 11 is an explanatory view showing an operation at an auxiliary-vacuum-chamber side in the vacuum transfer apparatus according to the embodiment.

In step F207, as shown in FIG. 11, the holding-table lift unit 27 lifts the holding table 26B conveyed to the auxiliary-vacuum-chamber side. Accordingly, the holding table 26B defines the lower wall of the auxiliary vacuum chamber 41. The substrate conveying unit 20 defines the upper wall of the auxiliary vacuum chamber 41 continuously from step F202 (FIG. 9).

In step F208, the air valve 24 is opened, so that the auxiliary vacuum chamber 41 is opened to air. In step F209, the open/close motor 21 lifts the substrate conveying unit 20 as shown in FIG. 12.

Then, the process returns to the steps started with step F201 at the auxiliary-vacuum-chamber side.

In step F201, the substrate conveying unit 20 conveys the disk substrate 1B with uncured UV-curable resin applied in the previous step, to a position above the auxiliary vacuum chamber 41 as shown in FIG. 13.

Then, in step F202, as shown in FIG. 14, the open/close motor 21 lowers the substrate conveying unit 20. Accordingly, the disk substrate 1B gripped with the substrate conveying unit 20 is conveyed to the auxiliary vacuum chamber 41. In step F203, the substrate conveying unit 20 passes the disk substrate 1B to the holding table 26B.

Figure 15:
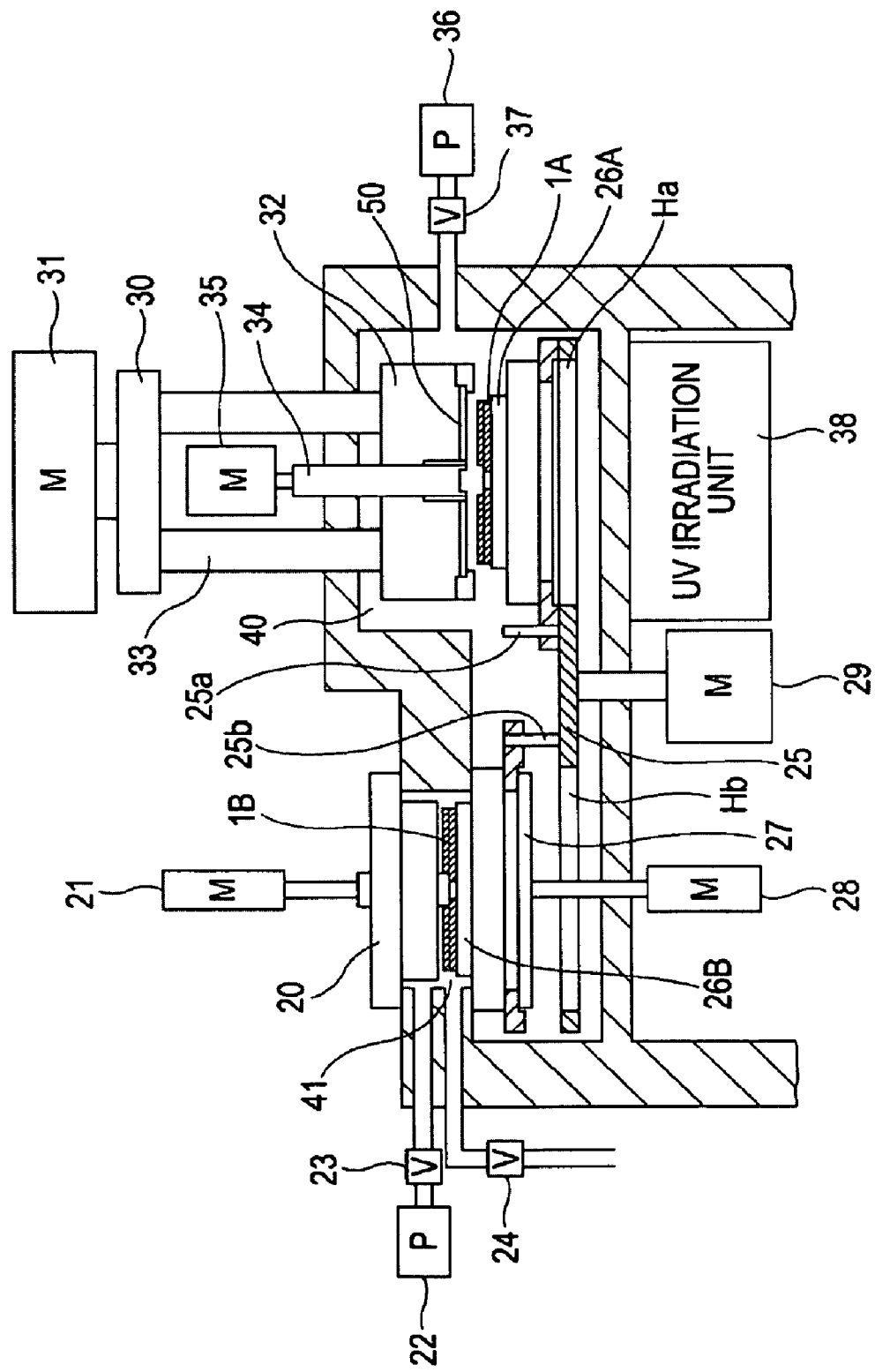
FIG. 15 is an explanatory view showing an operation during the removal of the stamper in the vacuum transfer apparatus according to the embodiment.

In step F204, in the state of FIG. 15, the auxiliary vacuum chamber 41 is vacuumized again. In particular, the air valve 24 is closed so that the auxiliary vacuum chamber 41 is completely sealed. Then, the vacuum valve 23 is opened and vacuuming is performed by the vacuum pump 22.

When the auxiliary vacuum chamber 41 obtains a predetermined degree of vacuum (for example, about 50 Pa) by vacuuming, in step F205, the holding table 26B is lowered, and conveys the disk substrate 1B to the main vacuum chamber 40 as shown in FIG. 16.

As described above, the state in FIG. 16 is a phase in which the stamper removal is competed for the disk substrate 1A at the transfer-unit side.

Next, step F206 is performed at the auxiliary-vacuum-chamber side, and step F305 is performed at the transfer-unit side. These steps are synchronously performed by a single operation that the conveying motor 29 rotates the conveying table 25 by 180°.

Accordingly, the disk substrate 1A is restored to the auxiliary-vacuum-chamber side, and the next disk substrate 1B is conveyed to the transfer-unit side. That is, the state is as shown in FIG. 17.

As described above, the disk substrate 1A is conveyed to the auxiliary vacuum chamber 41 as shown in FIG. 18, the auxiliary vacuum chamber 41 is opened to air, and then, the substrate conveying unit 20 conveys the disk substrate 1A from the auxiliary vacuum chamber 41 as shown in FIG. 19. At this time, in step F302, the L1-layer stamper 50 is pressed to the disk substrate 1B at the transfer-unit side as shown in FIG. 19.

Then, the UV irradiation in step F303, and the stamper removal in step F304 are performed for the disk substrate 1B at the transfer-unit side.

Though not shown, a next disk substrate is conveyed to the auxiliary-vacuum-chamber side, and steps F201 to F205 are performed.

In the vacuum transfer apparatus according to the embodiment, the above-described operations are performed in parallel at the auxiliary-vacuum-chamber side and the transfer-unit side every time when a disk substrate 1 is conveyed from the previous step.

The operation of the vacuum transfer apparatus according to the embodiment is described above. The vacuum transfer apparatus can provide advantages of an increase in process efficiency, decreases in manufacturing cost and equipment investment, and an increase in quality of optical disks to be manufactured.

An example method of a related art using a vacuum transfer apparatus (with a single vacuum chamber) may be a method in which a stamper transfers an uneven pattern on a disk substrate 1 in the vacuum transfer apparatus, the disk substrate 1 is conveyed to a UV irradiation apparatus from the vacuum transfer apparatus while the stamper and the disk substrate 1 are attached together, UV irradiation is performed to cure the uneven pattern, and then, the stamper is removed from the disk substrate 1.

In this case, briefly, a necessary process time is as follows.
Vacuuming of vacuum chamber: 1.8 seconds
Transfer of uneven pattern with stamper: 1 second
UV irradiation in UV irradiation apparatus after conveyance from vacuum transfer apparatus: 1.5 seconds
Stamper removal in UV irradiation apparatus after conveyance from vacuum transfer apparatus: 0.8 seconds
Total necessary time from conveyance of disk substrate to vacuum transfer apparatus, to UV irradiation apparatus, and then to a next step: 1 second Although these are approximate numerical values, a process time necessary for a single disk substrate 1 is 6.1 seconds in total.

In particular, the vacuum chamber has to be opened to air when the disk substrate 1 is conveyed from the vacuum chamber, and vacuuming has to be performed to obtain a sufficient degree of vacuum when the disk substrate 1 is conveyed to the vacuum chamber. Owing to this, the vacuum chamber expects about 1.8 seconds for every vacuuming.

In contrast, in the case of the vacuum transfer apparatus according to the embodiment, assuming that the performances of the vacuum pump, stamper transfer, and conveyance, etc., are equivalent to those of the vacuum transfer apparatus of the related art, a necessary process time is as follows.

Vacuuming of vacuum chamber: 1 second
Transferring of uneven pattern with stamper: 1 second
UV irradiation: 1.5 seconds
Stamper removal: 0.8 seconds
Total time for conveyance of disk substrate to and from vacuum transfer apparatus (conveyance to next process): 1 second It is found that a time necessary for vacuuming is reduced by an amount ranging from about 1.8 seconds to about 1 second. This is because opening to air and vacuuming are performed at the auxiliary vacuum chamber 41 in parallel to the conveyance of the disk substrate 1. Since the auxiliary vacuum chamber 41 does not use a relatively large space as for stamper transfer, the auxiliary vacuum chamber 41 may have a small spatial volume as illustrated. Also, since the auxiliary vacuum chamber 41 is a space not for the stamper transfer, the degree of vacuum of the auxiliary vacuum chamber 41 may be lower than that of the main vacuum chamber 40. Accordingly, vacuuming can be immediately performed even if the suction performance of the vacuum pump is equivalent between the embodiment and the related art.

The simply added, total time of the above steps is 5.3 seconds.

Further, since the auxiliary vacuum chamber 41 and the main vacuum chamber 40 are provided in this embodiment, steps can be performed in parallel at the auxiliary-vacuum-chamber side and the transfer-unit side as described above.

As described above for the operation of the embodiment, opening to air of the auxiliary vacuum chamber 41, conveyance to and from the auxiliary vacuum chamber 41, and vacuuming of the auxiliary vacuum chamber 41, are performed while the transfer of the uneven pattern with the stamper, the UV irradiation, and the stamper removal are performed in the main vacuum chamber 40.

That is, considering that vacuum transfer is performed continuously for a plurality of disk substrates 1, a process cycle time for a single disk substrate may ignore a time for vacuuming in the auxiliary vacuum chamber 41. Therefore, a total time as a cycle time for a single disk substrate 1 may be 4.3 seconds, which excludes 1 second for vacuuming.

Further, the total time includes the opening to air of the auxiliary vacuum chamber 41, and the conveyance to and from the auxiliary vacuum chamber 41, as 1 second. However, since the steps are also performed in parallel, the total time for the conveyance of the substrate may be substantially decreased. That is, a process time for a single disk substrate 1 may only include a conveyance time by rotation of the conveying table 25. As a result, a cycle time for a single disk substrate 1 can be decreased to 4 seconds or shorter.

Therefore, with the vacuum transfer apparatus according to the embodiment, since the main vacuum chamber 40 and the auxiliary vacuum chamber 41 are provided, the vacuum transfer process can be markedly efficient.

Alternatively, even in the process of the related art, the process can become more efficient by using a plurality of stampers. In other words, a plurality of lines each including a vacuum transfer apparatus and a UV irradiation apparatus may be arranged in parallel. Still alternatively, a plurality of stampers may be used in a single line, so that a disk substrate and a stamper during transfer are conveyed to a UV irradiation apparatus, and another stamper transfers a pattern to another disk substrate. Accordingly, although a time for vacuuming is still necessary, a cycle time for a single disk substrate can be decreased by a certain amount.

In such cases, however, the quality control of the plurality of stampers is a seriously troublesome work. This may increase a process load, thereby degrading the efficiency as described above. Also, the equipment investment for manufacturing is seriously increased.

In contrast, with the vacuum transfer apparatus according to the embodiment, since the stamper transfer, the UV irradiation, and the stamper removal are performed at the same position (at the transfer-unit side) in the vacuum transfer apparatus, an increase in the process efficiency using a single stamper can be obtained. That is, the embodiment can provide an increase in the process efficiency without increasing the equipment investment and the work for the stamper control.

Further, since the steps from the transfer with the stamper to the stamper removal are performed in the main vacuum chamber 40, in other words, since no conveyance to the outside of the vacuum space is performed during these steps, dusts and the like would not enter the main vacuum chamber 40 during transfer. Accordingly, uneven pattern transfer with a high quality can be provided, and a decrease in yield due to dusts and the like adhering during conveyance can be prevented.

Still further, in the structure of the vacuum transfer apparatus according to the embodiment, the substrate conveying unit 20 and the holding table 26A or 26B have functions of sealing and opening the space of the auxiliary vacuum chamber 41 during the conveyance operation, in addition to the function of conveying the disk substrate 1. Hence, the structure does not have an excessive structure portion, thereby being an effective structure. This promotes a decrease in size of the vacuum transfer apparatus.

The embodiment is described above. However, the invention is not limited to the above-described embodiment. While the vacuum transfer unit is used in the process of forming the pit pattern of the L1 layer and the spacer layer in the manufacturing procedure of a reproduction-only two-layer disk in the embodiment, the present invention may be applied to a manufacturing procedure of a single-layer disk, or a disk having three or more recording layers.

For example, the vacuum transfer apparatus may perform a similar operation to that described above in a process of forming a pit pattern and a spacer layer (or cover layer) as third and fourth recording layers of a disk having three or more layers.

Also, when a first recording layer (L0 layer) is to be formed in a single-layer disk, or a multilayer disk, the vacuum transfer apparatus according to the embodiment of the present invention may be used instead of formation by injection molding. For example, UV-curable resin is applied on a disk substrate (for example, glass substrate) having a flat surface, and the operation of the embodiment is performed in the vacuum transfer apparatus. Accordingly, a pit pattern serving as a L0 layer can be formed.

Of course, the uneven pattern does not have to be a pit pattern for forming a reproduction-only disk, and may be a groove pattern for a write-once disk, a rewritable disk, or the like. If the stamper used in the vacuum transfer apparatus is replaced with a stamper for groove transfer, the present invention may be applied to a manufacturing procedure for a write-once disk, that for a rewritable disk, or the like.

Also, the present invention may be applied to manufacturing of various kinds of disks, such as a blue-ray disc, a digital versatile disc (DVD), a compact disc (CD), and the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A vacuum transfer apparatus comprising:
    an auxiliary vacuum chamber capable of being vacuumized with a vacuum suction mechanism and being opened to air with an open-to-air mechanism;
    a main vacuum chamber capable of being vacuumized with a vacuum suction mechanism;
    a substrate conveying unit located above the auxiliary vacuum chamber and that conveys a disk substrate to and from the auxiliary vacuum chamber, and when the substrate conveying unit is lowered to a position where the substrate conveying unit comes into contact with an upper side of the auxiliary vacuum chamber the substrate conveying unit serves as an upper wall to seal the auxiliary vacuum chamber;
    an inter-chamber conveying unit that conveys the disk substrate between the auxiliary vacuum chamber and the main vacuum chamber and that includes a holding table, and when the holding table is raised to a position where the holding table comes into contact with a lower side of the auxiliary vacuum chamber the holding table serves as a lower wall to seal the auxiliary vacuum chamber; and
    a transfer unit that performs a transfer process in which an uneven pattern is transferred on the disk substrate in the main vacuum chamber with a stamper,
    wherein the main vacuum chamber is continuously in vacuum during an operation thereof,
    wherein the auxiliary vacuum chamber is vacuumized when the substrate conveying unit has conveyed the disk substrate to the auxiliary vacuum chamber,
    wherein after the vacuuming, the inter-chamber conveying unit conveys the disk substrate from the auxiliary vacuum chamber to the main vacuum chamber, and the transfer unit performs the transfer process, and
    wherein after the transfer process, the inter-chamber conveying unit conveys the disk substrate with the transfer process performed, from the main vacuum chamber to the auxiliary vacuum chamber, the auxiliary vacuum chamber is opened to air, and the substrate conveying unit conveys the disk substrate from the auxiliary vacuum chamber.

2. The vacuum transfer apparatus according to claim 1,
    wherein the substrate conveying unit conveys the disk substrate with uncured UV-curable resin applied,
    wherein the vacuum transfer apparatus further includes a UV irradiation unit that performs UV irradiation to the disk substrate for the transfer process in the main vacuum chamber, and
    wherein during the transfer process with the transfer unit, the UV-curable resin with an uneven pattern is cured by the UV irradiation with the UV irradiation unit, the stamper is removed from the disk substrate after the UV-curable resin is cured, and the inter-chamber conveying unit conveys the disk substrate from the main vacuum chamber to the auxiliary vacuum chamber.

3. The vacuum transfer apparatus according to claim 1,
    wherein the auxiliary vacuum chamber has a smaller spatial volume than that of the main vacuum chamber, and
    wherein the auxiliary vacuum chamber is vacuumized to a lower degree of vacuum than that of the main vacuum chamber.

4. A vacuum transfer method for forming an uneven pattern on a disk substrate with a vacuum transfer apparatus having a main vacuum chamber and an auxiliary vacuum chamber, the method comprising:
    vacuumizing the main vacuum chamber;
    conveying the disk substrate to the auxiliary vacuum chamber with a substrate conveying unit, sealing an upper wall of the auxiliary vacuum chamber with a lower portion of the substrate conveying unit that is located above the auxiliary vacuum chamber, and sealing a lower wall of the auxiliary vacuum chamber with an upper portion of an inter-chamber conveying unit located inside of the main vacuum chamber;
    vacuumizing the auxiliary vacuum chamber, and then conveying the disk substrate from the auxiliary vacuum chamber to the main vacuum chamber with the inter-chamber conveying unit;
    performing a transfer process in which the uneven pattern is transferred on the disk substrate with a stamper in the main vacuum chamber;
    conveying the disk substrate with the transfer process performed, from the main vacuum chamber to the auxiliary vacuum chamber with the inter-chamber conveying unit; and
    opening the auxiliary vacuum chamber to air, and conveying the disk substrate from the auxiliary vacuum chamber with the substrate conveying unit.

* * * * *